United States Patent
Crowley

(10) Patent No.: US 11,628,934 B2
(45) Date of Patent: Apr. 18, 2023

(54) REEL SYSTEM FOR AN UNMANNED AERIAL VEHICLE AND RELATED METHODS

(71) Applicant: AGCO Corporation, Duluth, GA (US)

(72) Inventor: Mark Aron Crowley, Spirit Lake, IA (US)

(73) Assignee: AGCO Corporation, Duluth, GA (US)

( * ) Notice: Subject to any disclaimer, the term of this patent is extended or adjusted under 35 U.S.C. 154(b) by 275 days.

(21) Appl. No.: 17/089,490

(22) Filed: Nov. 4, 2020

(65) Prior Publication Data

US 2021/0147074 A1     May 20, 2021

Related U.S. Application Data

(60) Provisional application No. 62/936,641, filed on Nov. 18, 2019.

(51) Int. Cl.

| | | |
|---|---|---|
| *B64U 10/60* | (2023.01) | |
| *B64C 39/02* | (2023.01) | |
| *B64U 70/00* | (2023.01) | |
| *B64U 80/86* | (2023.01) | |
| *B64U 101/60* | (2023.01) | |
| *B64U 101/40* | (2023.01) | |

(52) U.S. Cl.
CPC .......... *B64C 39/022* (2013.01); *B64C 39/024* (2013.01); *B64U 10/60* (2023.01); *B64U 70/00* (2023.01); *B64U 80/86* (2023.01); *B64U 2101/40* (2023.01); *B64U 2101/60* (2023.01)

(58) Field of Classification Search
CPC ....... B64C 39/02; B64C 39/022; B64C 37/02; B64C 2201/12; B64C 2201/128; B64C 2201/208; B64D 1/16; B64D 1/18; B64D 1/22; B64F 3/00; A01G 25/09; A01G 25/095; A01G 25/097; A01D 46/30; B63B 35/50
See application file for complete search history.

(56) References Cited

U.S. PATENT DOCUMENTS

| | | | | |
|---|---|---|---|---|
| 2,980,365 | A | * | 4/1961 | Yohe ...................... B64C 39/022 |
| | | | | 244/17.23 |
| 3,381,922 | A | * | 5/1968 | Laing ...................... B64D 1/16 |
| | | | | 244/17.17 |

(Continued)

FOREIGN PATENT DOCUMENTS

| | | |
|---|---|---|
| CN | 103754368 A | 4/2014 |
| CN | 205168900 U | 4/2016 |

(Continued)

OTHER PUBLICATIONS

TimesofIsrael, "Startup says time is ripe for fleets of drones to help farmers pick fruit", published Apr. 30, 2019 @ https://www.freshplaza.com/article/9098792/startup-says-time-is-ripe-for-fleets-of-drones-to-help-farmers-pick-fruit/.

(Continued)

*Primary Examiner* — Christopher D Hutchens
*Assistant Examiner* — Michael A. Fabula

(57) ABSTRACT

A system comprising a reel, a tether configured to be wound about the reel, and at least one unmanned aerial vehicle attached to the tether. When unmanned aerial vehicle is at rest, the unmanned aerial vehicle resides on the reel. Related methods of operating such a system can be used to extract crop from a field.

18 Claims, 14 Drawing Sheets

(56) References Cited

U.S. PATENT DOCUMENTS

| | | | | |
|---|---|---|---|---|
| 4,058,277 | A | * | 11/1977 | Kozakiewicz ............ B64F 3/00 244/17.17 |
| 8,602,349 | B2 | * | 12/2013 | Petrov ................. G05D 1/0866 244/17.23 |
| 2016/0192588 | A1 | * | 7/2016 | Smith .................... A01D 46/22 56/10.2 B |
| 2016/0318607 | A1 | * | 11/2016 | Desai ................... B64C 39/022 |
| 2017/0043872 | A1 | * | 2/2017 | Whitaker .............. B64C 39/024 |
| 2017/0291704 | A1 | * | 10/2017 | Alegria ................ G08G 5/0039 |
| 2018/0326441 | A1 | * | 11/2018 | Liu ......................... G05D 1/104 |
| 2018/0335372 | A1 | * | 11/2018 | Orol ......................... G01N 1/08 |
| 2018/0354618 | A1 | * | 12/2018 | Schuett ................ B64C 39/024 |
| 2019/0106212 | A1 | * | 4/2019 | Furukawa ............ B65H 75/425 |
| 2021/0129729 | A1 | * | 5/2021 | Cohen ........................ B64F 1/22 |
| 2021/0146388 | A1 | * | 5/2021 | Crowley .................. B64D 1/18 |
| 2021/0147080 | A1 | * | 5/2021 | Crowley ................ A01D 46/30 |

FOREIGN PATENT DOCUMENTS

| | | | | |
|---|---|---|---|---|
| CN | 205891238 | U | | 1/2017 |
| CN | 108001687 | A | | 5/2018 |
| CN | 110250143 | A | | 9/2019 |
| DE | 102015010152 | A1 | * | 2/2017 |
| DE | 102017207906 | A1 | | 11/2018 |
| EP | 3653051 | A1 | | 5/2020 |
| NL | 1012141 | C2 | * | 11/2000 ............... A01K 1/01 |
| WO | 2016/123656 | A1 | | 8/2016 |

OTHER PUBLICATIONS

Caroline Delbert, "Here's John Deere's Cropdusting Drone" Popular Mechanics, Nov. 7, 2019 @ https://www.popularmechanics.com/technology/infrastructure/a29728347/john-deere-volocopter/.

Igus® Inc., "Plastic energy chains reduce downtime & increase service life of cables" published @https://www.igus.com/info/energychains, referenced Apr. 2019.

Embention, "Leaders in Autopilots and Components for Drones & UAM", published @https://www.embention.com/referenced Apr. 2019.

UK Intellectual Property Office, Search Report for related UK Application No. GB1917859.9, dated Jun. 8, 2020.

* cited by examiner

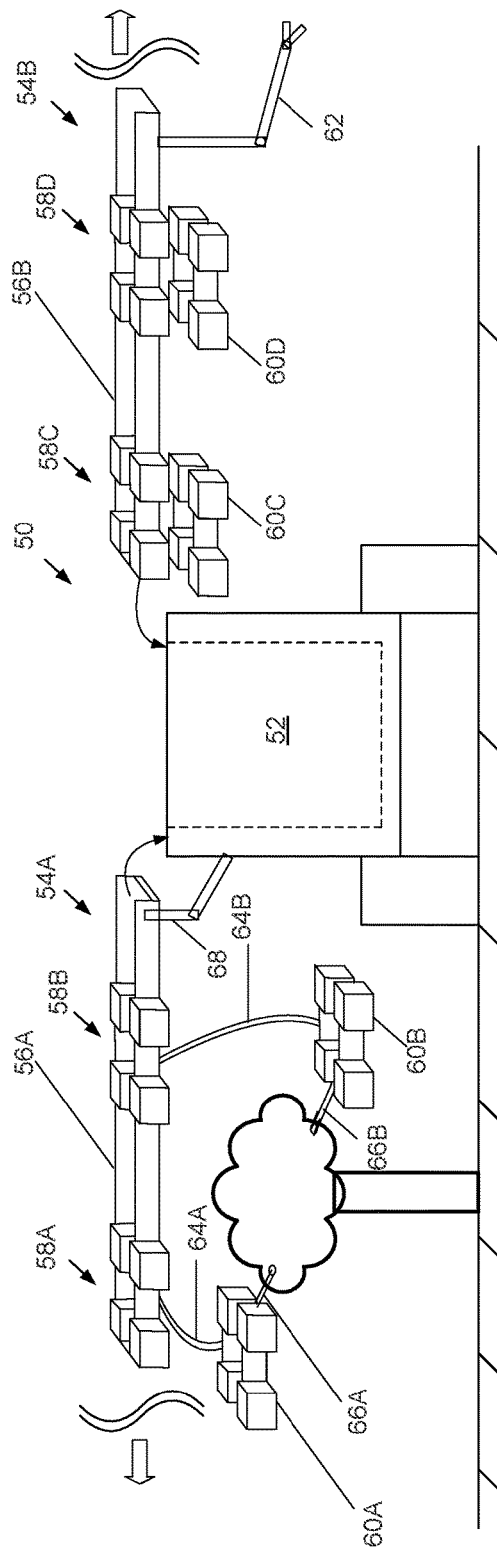
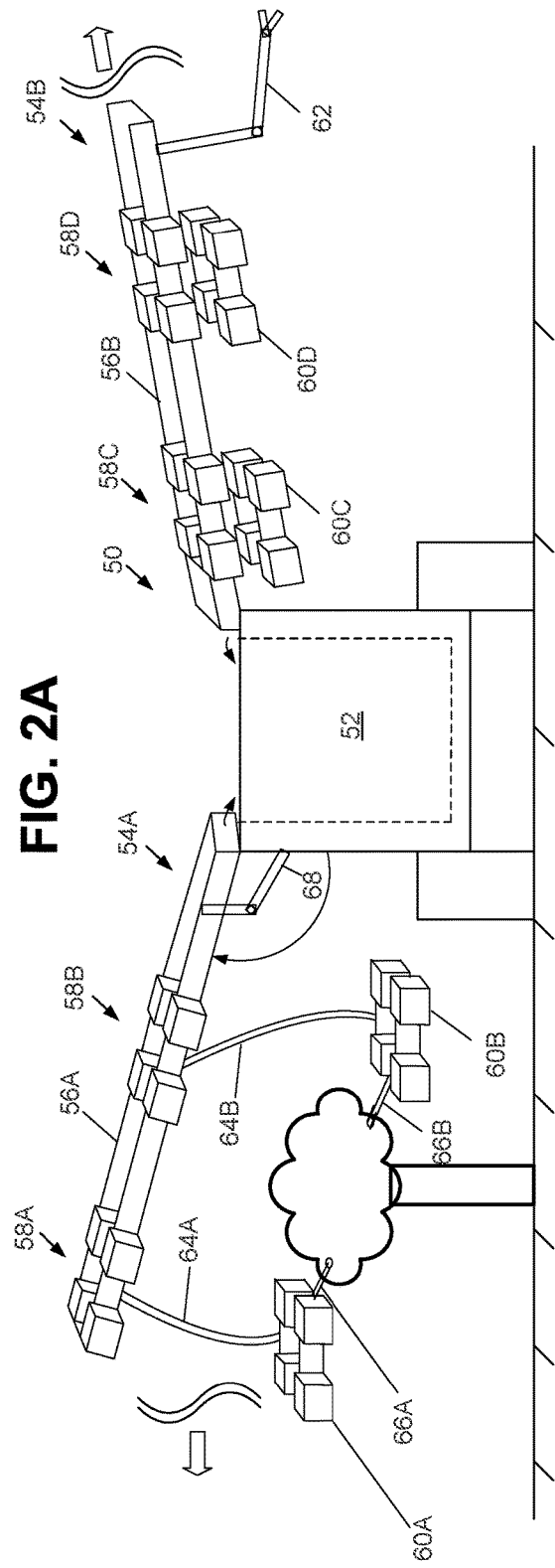
FIG. 2A
FIG. 2B

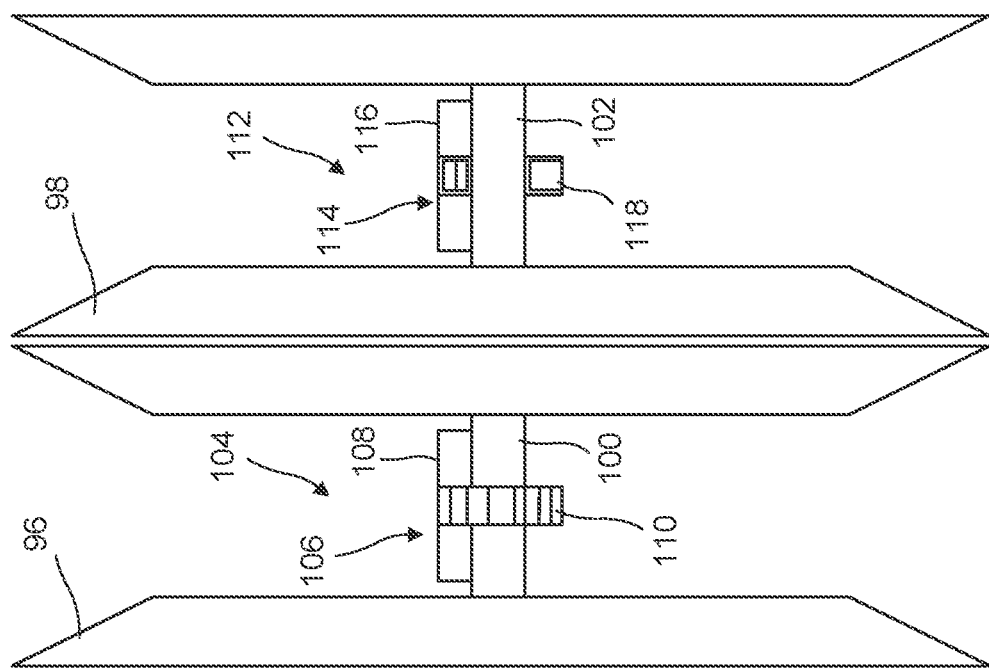
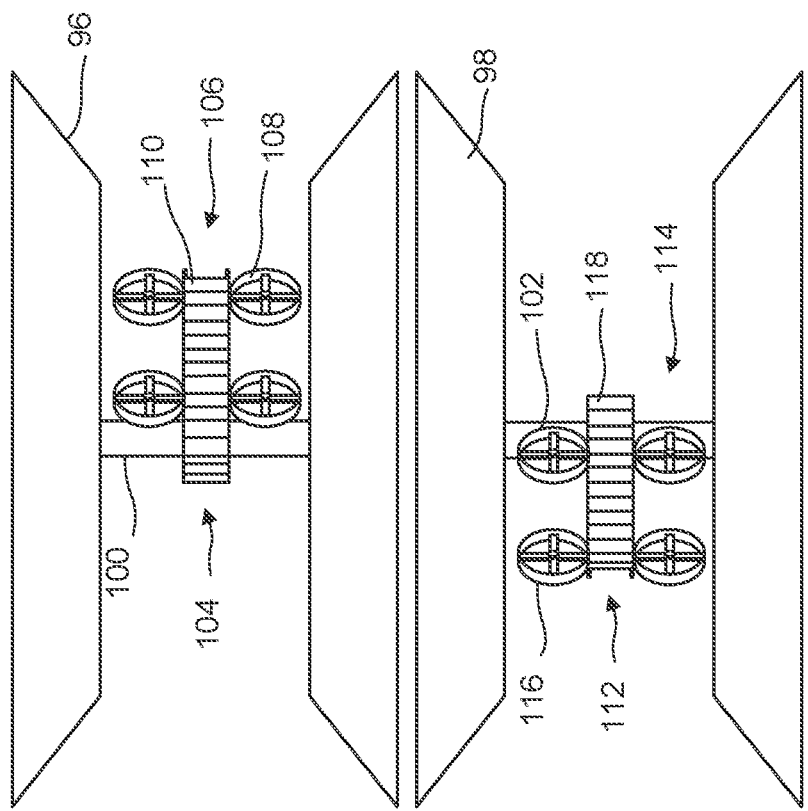
FIG. 5B
FIG. 5A

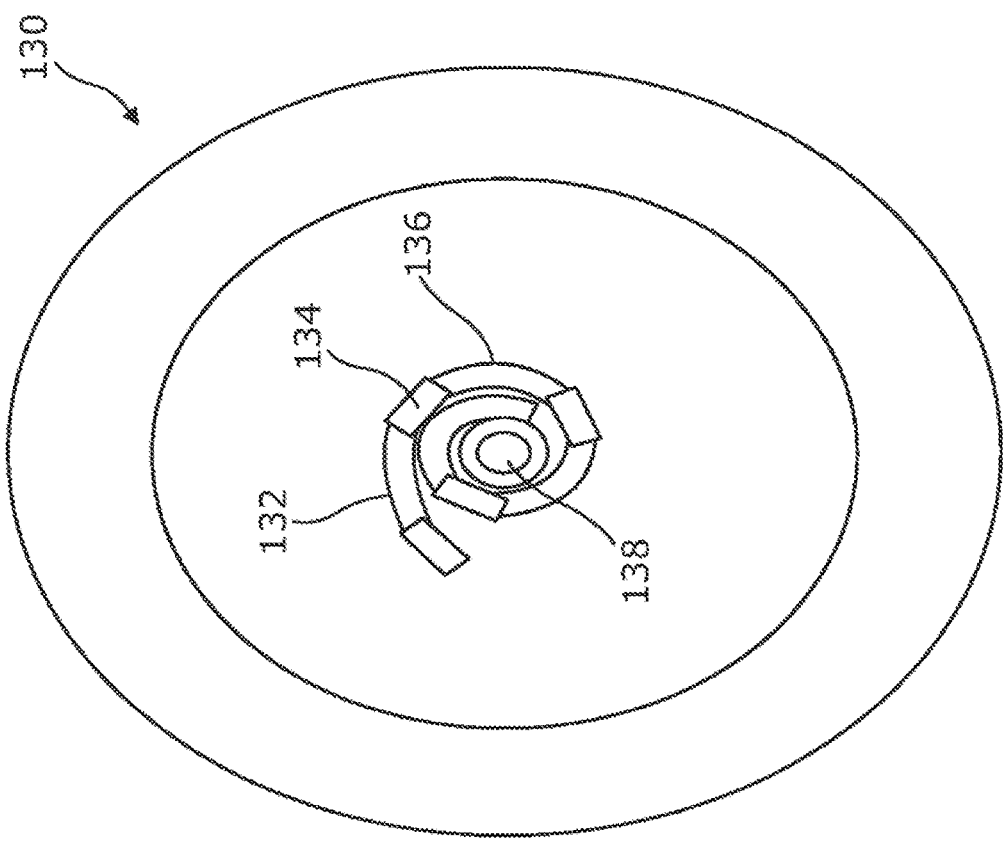
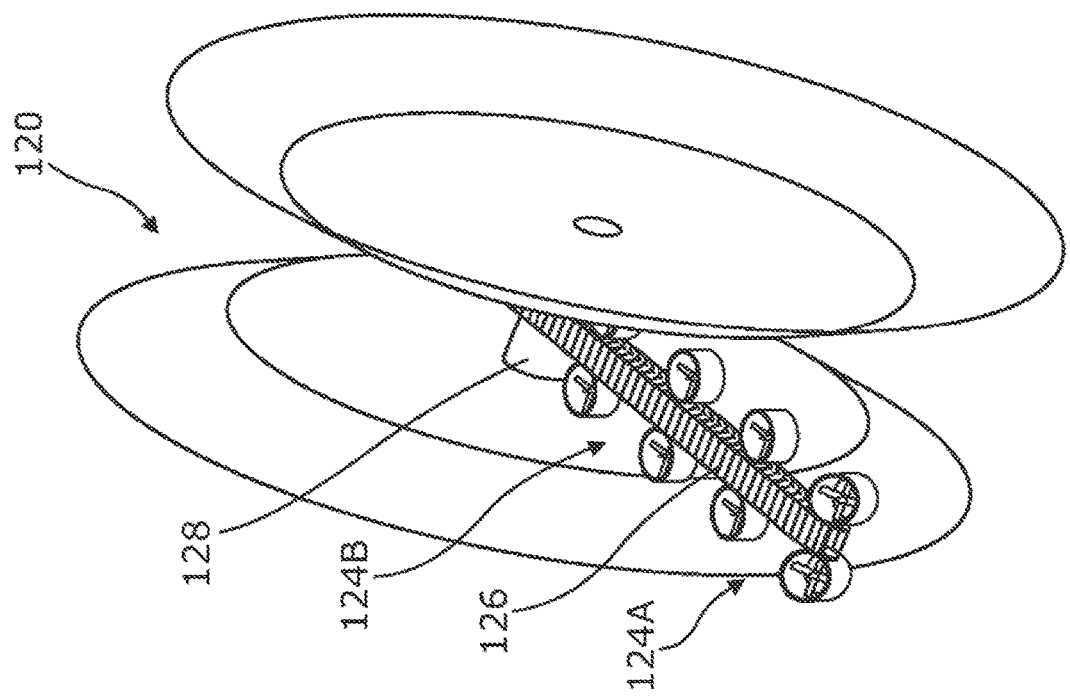
Fig. 5D
Fig. 5C

240

↓

START

↓

242 — RECEIVE LIQUID MATERIAL AT ONE OR MORE NOZZLES FROM A FLUID-CARRYING MEDIUM FLUIDLY COUPLED TO THE ONE OR MORE NOZZLES

↓

244 — DISCHARGE THE LIQUID MATERIAL THROUGH ONE OR MORE FANS OF AN UNMANNED AERIAL VEHICLE

↓

END

START

254 — SUSPEND A CROP CONVEYING MEDIUM IN AIR USING PLURAL UNMANNED AERIAL VEHICLES TETHERED TOGETHER

256 — USE ONE OR MORE CROP EXTRACTION DEVICES TO EXTRACT CROP AND TRANSFER THE CROP TO THE CROP CONVEYING MEDIUM

END

FIG. 10

REEL SYSTEM FOR AN UNMANNED AERIAL VEHICLE AND RELATED METHODS

CROSS-REFERENCE TO RELATED APPLICATION

This application claims the benefit of and priority from U.S. Provisional Application No. 62/936,641, filed Nov. 18, 2019, "Reeling Mechanism for an Aerial Boom," the entire disclosure of which is hereby incorporated by reference.

FIELD

The present disclosure is generally related to working vehicles, and in particular, booms for working vehicles such as agricultural sprayers and crop extractors.

BACKGROUND

Many different industries use working vehicles with boom attachments to dispense material to vegetation or the soil. For instance, in the case of the agricultural industry, sprayer vehicles may comprise a boom with a plurality of evenly spaced nozzles that dispense liquid material used to fertilize vegetation or provide for weed or pest control.

Though liquid dispensing booms provide for efficient coverage of a large swath of area on each pass, challenges are also present. For instance, boom designs are limited by weight and length, and may have a limited height and/or envelope adjustment. Some systems have been developed that address these limitations. For instance, German patent application DE 10 2017 207 906 A1, "Field Spraying System for Agricultural Fields," published Nov. 15, 2018, describes field sprayers that are connected a flexible media line carried by plural unmanned aerial vehicles. This approach of using unmanned aerial vehicles for dispensing of material in an agricultural setting removes the need for complicated boom folding techniques and/or heavy shoring, and provides for a flexible support system formed from aircraft. However, given the relative infancy of using unmanned aerial vehicles for such applications, opportunities abound for further improvements in such systems.

BRIEF SUMMARY

In one embodiment, a system includes a reel, a tether configured to be wound about the reel, and at least one unmanned aerial vehicle attached to the tether. When the at least one unmanned aerial vehicle is at rest, the at least one unmanned aerial vehicle resides on the reel.

A method includes rotating a reel having a tether and at least one unmanned aerial vehicle wound thereabout to unwind the tether, and launching the at least one unmanned aerial vehicle as the tether unwinds from the reel.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A-2B are schematic diagrams that illustrate in fragmentary, rear elevation views, respectively, various embodiments of an aerial boom for use in extraction of crop.

FIGS. 5A-5D are schematic diagrams that illustrate, in fragmentary views, an embodiment of example reels for winding and unwinding the unmanned aerial vehicles.

FIG. 8 is a flow diagram that illustrates an embodiment of an example method for spraying through one or more fans of unmanned aerial vehicles.

FIG. 10 is a flow diagram that illustrates an embodiment of an example method for extracting crop from an aerial boom.

DETAILED DESCRIPTION

Figure 1A:
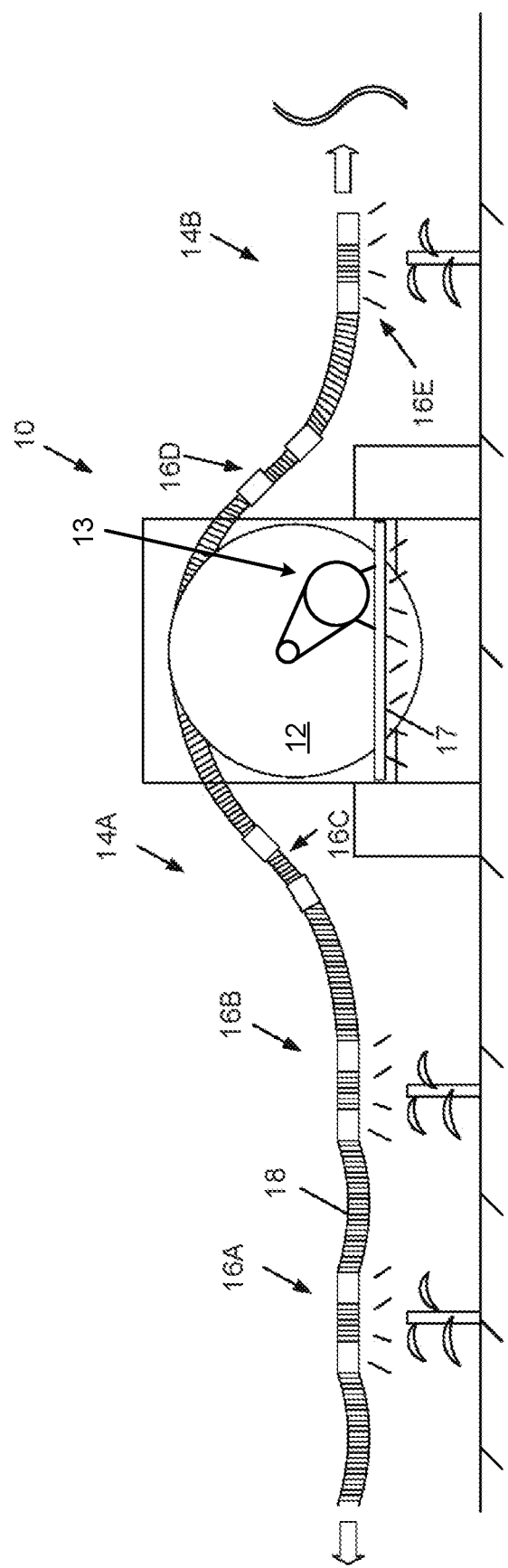
FIG. 1A is a schematic diagram that illustrates, in fragmentary, rear elevation view, a vehicle with an example aerial boom having unmanned aerial vehicles launched from a reel or reels and for discharging material on vegetation or soil.

Certain embodiments of an aerial boom and associated systems and methods are disclosed that include one or more unmanned aerial vehicles that are used in conjunction with a terrestrial vehicle to dispense material onto vegetation or soil, or in some embodiments, to extract crop from trees or plants. In one embodiment, an aerial boom includes one or more unmanned aerial vehicles, a fluid-carrying medium, and one or more nozzles arranged to dispense material through one or more fans of the unmanned aerial vehicles. In another embodiment, a system for launching the unmanned aerial vehicles includes one or more reels and one or more unmanned aerial vehicles tethered to the respective reels, and the unmanned aerial vehicles are unwound from the reel when launched. In another embodiment, an aerial boom is configured for aerial crop extraction, including plural unmanned aerial vehicles tethered together and configured to suspend a crop-conveying medium in air, and one or more extraction devices configured as an unmanned aerial vehicle or a robotic arm to extract crop from a plant, tree, or from the soil.

Traditional mechanical booms typically comprise a foldable, height-adjustable, rigid frame with plumbing (e.g., valves, nozzles, pumps, fittings, etc.), pumps and/or motors, and power and/or control cabling (e.g., electrical/electronic cabling) carried by the chassis of the working vehicle (e.g., sprayer vehicle) and the boom frame. Such conventional booms have limits in size and scope, and in some instances, are being replaced at least in part by tethered unmanned aerial vehicles that support a media line having nozzles for dispensing liquid material. However, various engineering challenges to these newer systems afford an opportunity for further developments in such systems, including in the manner of nesting and launching the unmanned aerial vehicles, manner of dispensing material, and/or in the application of the aerial boom. Certain embodiments of aerial booms disclosed herein address one or more of these challenges.

Reference will now be made in detail to the description of certain embodiments of an aerial boom as illustrated in the drawings. While the aerial boom will be described in connection with these drawings, there is no intent to limit it to the embodiment or embodiments disclosed herein. For instance, though emphasis is placed on self-propelled vehicles, some embodiments of an aerial boom operate in conjunction with a towed vehicle. As another example, though emphasis is on the use of unmanned aerial vehicles (e.g., drones) each configured as a quad-coptor using electric-ducted fans, unmanned aerial vehicles using fewer or additional fans or, similarly, propellers, may be used in some embodiments. Also, though vehicles for the agricultural industry are described, vehicles (self-propelled or towed) from other industries may similarly benefit from the aerial booms disclosed herein, including from industrial, municipal, and/or construction and/or mining industries. Further, although the description identifies or describes specifics of one or more embodiments, such specifics are not necessarily part of every embodiment, nor are all various stated advantages necessarily associated with a single embodiment or all embodiments. Further, it should be appreciated in the context of the present disclosure that the claims are not necessarily limited to the particular embodiments set out in the description.

References hereinafter to certain directions, such as, for example, "front," "rear," "left," and "right," are made as viewed from the rear of the vehicle looking forward. The terms fore, aft, transverse, and lateral, as used herein, are referenced to the longitudinal centerline of the vehicle chassis as the vehicle travels in a forward direction.

FIG. 1A is a schematic diagram that illustrates an embodiment of an example aerial boom having unmanned aerial vehicles launched from a reel or reels and for discharging material on vegetation or soil. In particular, shown in fragmentary, rear elevation view, is a rear portion of a self-propelled vehicle 10 having a chassis that supports reels 12 (one shown, with optional others obscured from view), a tank or storage bin (or other types of storage, also obscured from view by the reel 12) and an aerial boom 14 (e.g., 14A, 14B). The vehicle 10 may include wheels, tracks, or a combination of both, and comprises a chassis of suitable size and strength to support the tank, hydronic, hydraulic, and/or pneumatic components (e.g., pumps, motors, valves, fittings, fluid-carrying medium, such as hoses, tubing, etc.), electrical components (e.g., motor(s) to turn the reels 12, cabling, including electrical/electronic cabling from an energy source located on the vehicle 10), the reels 12, and unmanned aerial vehicles 16 and tether collectively wound about and residing on the reels 12 when the unmanned aerial vehicles 16 are at rest. The tank may store liquid material, including pesticides, herbicides, insecticides, fungicides, fertilizer, etc. The aerial boom 14 shown in FIG. 1A includes a plurality of unmanned aerial vehicles 16 (e.g., 16A, 16B, 16C, 16D, and 16E) tethered to one another via a semi-flexible carrier 18. The semi-flexible carrier 18 also couples electric-ducted fans of each of the unmanned aerial vehicles 16 together. In the description that follows, the unmanned aerial vehicles 16 are each described as a single unit or node having four (4) electric-ducted fans arranged as a quad-coptor. In some embodiments, a different number of fans may be associated with each unit or node. Further, though described as an electric-ducted fan, each of the fans for certain embodiments of the unmanned aerial vehicles 16 may be configured as non-ducted fans or propellers.

The semi-flexible carrier 18 may be made of a light material, such as plastic, which provides a compromise between flexibility and rigidity for enabling a solid structure for supporting electrical/electronic cabling (e.g., to convey power and control signals for the nozzles, the unmanned aerial vehicles 16, sensors, etc.) and a fluid-carrying medium (e.g., hoses, tubing for conveying liquid material to nozzles fluidly coupled to the fluid-carrying medium) while enabling winding and unwinding of the carrier 18 and unmanned aerial vehicles 16 to and from the reels 12. In one embodiment, the semi-flexible carrier 18 may include an articulated chain cable carrier, such as those available from Igus, Inc., of East Providence, R.I., under the trademark E-CHAIN SYSTEMS®, though other carrier systems and/or manufacturers may be used. In some embodiments, the fluid-carrying medium may be separate from the carrier 18. In some embodiments, the carrier 18 may be used to couple the fans of each of the unmanned aerial vehicles 16 to each other, and the carrier 18 may be omitted from segments of the boom 14 between the unmanned aerial vehicles 16 (as depicted in FIG. 4C and described in more detail below). For instance, the tethering between the unmanned aerial vehicles 16 may be limited to the fluid-carrying medium and electrical/electronic cabling.

In one embodiment, one or more of the reels 12 are energized (e.g., rotated, at least initially) via a motor 13. In some embodiments, the reels 12 may freely rotate, at least in part, under the influence of the unmanned aerial vehicles. For instance, through activation of the aerial boom 14 by an operator at a user interface (e.g., a button or switch in the passenger cabin or from a remote location, an on-screen button icon, or switch proximal to the reels 12), or via auto-activation via geo-fencing awareness (e.g., based on sensing the location of the field, such as through a navigational system or cellular-based triangulation identification of the area located in the passenger cabin or at the unmanned aerial vehicles 16), the reels 12 may be set in rotation (e.g., via a motor(s)) to begin the unwinding of one of the unmanned aerial vehicles 16. At or around a time that the unmanned aerial vehicle 16 (e.g., unmanned aerial vehicle 16A) is loosened from its perch on the reel 12 (e.g., as triggered by an elapsed time from activation, a sensor detecting the location of the unmanned aerial vehicle 16 relative to its perch on the reel 12, or via a tension sensor (e.g., tension of the tether between the reel and the unmanned aerial vehicle 16), the unmanned aerial vehicle 16A activates and its fans are energized to enable the unmanned aerial vehicle 16 to go airborne and launch in a direction away from the reel 12. This action pulls the tether, causing, alone or in coordination with the motor of the reel 12, the next unmanned aerial vehicle 16 to be unwound and loosened from its perch on the reel 12. At or around a time that this next unmanned aerial vehicle 16 is loosened from its perch, the unmanned aerial vehicle 16 (e.g., unmanned aerial vehicle 16B) activates and its fans are energized to cause the unmanned aerial vehicle 16B to go airborne and pull the tether and the next unmanned aerial vehicle 16 (e.g., 16C) from the reel 12. This process is repeated (for each reel 12 and aerial boom 14) to cover a selected area of the field for material distribution thereon. Reference to the tether includes the electrical/electronic cabling, the fluid-carrying medium, and the carrier 18 in some embodiments.

Various control measures dictate the extent to which the aerial booms 14 extend out laterally and/or their flight patterns. In one embodiment, the unmanned aerial vehicles 16 simply extend to their fullest length on one or both sides of the vehicle 10 when activated, and then dispense liquid material (e.g., via the nozzles) over rows of vegetation or over furrows. In some embodiments, one (e.g., the first one launched) or more of the unmanned aerial vehicles may be equipped with navigational system controls (e.g., global navigation satellite system (GNSS)) and in cooperation with navigational software, and may extend out and fly according to an uploaded field map (e.g., uploaded from an on-board controller), where the extent of lateral reach of the aerial boom 14 is dynamically adjusted based on the field map and the sensed navigational coordinates. The unmanned aerial vehicles 16 may alternatively or additionally be equipped with recognition sensors that enable a flight pattern or plan of each of the unmanned aerial vehicles based on the identification and tracking of the rows of vegetation (or furrows in the soil). In some embodiments, the extent of the lateral reach of the aerial boom and/or flight pattern may be controlled by a controller on-board the vehicle, where sensors of each of the unmanned aerial vehicles feed-back the identity of rows or furrows to enable control signals for the flight pattern to be sent (e.g., wirelessly or via the electrical/electronic cabling) to each of the unmanned aerial vehicles 16. In some embodiments, any one or a combination of these control measures (or others) may be used at one or a plurality of stages of activation, flight, and/or material discharge from the nozzles. The use of unmanned aerial vehicles 16 enables adjustments to variations in terrain, plant, and/or soil conditions, and when flight paths are performed autonomously through navigational systems and/or sensors, alleviates the burden on an operator of the vehicle 10 since adjustments in when and/or where to dispense liquid material may be autonomously and dynamically adjusted to meet the needs of the field and/or vegetation through the maneuverability afforded by the unmanned aerial vehicles.

When operations are complete, or during operation when less length of the aerial booms 14 are needed (e.g., where ponds of water or roadways are in the field), communication from the unmanned aerial vehicles 16 to the vehicle controller may cause the motor(s) of the reel or reels 12 to reverse rotation and one or more of the unmanned aerial vehicles may be pulled closer to the vehicle 10 while the tether and unmanned aerial vehicles 16 are returned to their perch on the reel(s) 12. For instance, at a certain sensed distance (e.g., using LI DAR on or near the reel 12 or on the unmanned aerial vehicle, or other type of proximity sensor), the unmanned aerial vehicle nearest the reel 12 may go into landing mode and reduce the fan rotation until landing on the reel 12, where the fans are de-energized and the reel rotates to wind this unmanned aerial vehicle 16 onto the reel 12. This process repeats itself for any subsequent unmanned aerial vehicles 16 that return to its perch on the reel 12.

The reels 12 may be operated independently of each other, depending on the material to be applied on each side of the vehicle 10.

Though described with plural unmanned aerial vehicles 16, in some embodiments, a single unmanned aerial vehicle 16 may be launched from, and returned to, its own dedicated reel.

In some embodiments, the aerial booms 14 may be supplemented with a rigid spray assembly. For instance, the vehicle 10 may have a spray bar 17 to apply material to areas directly behind the vehicle 10. In some embodiments, the area directly behind the vehicle 10 may be covered (e.g., without the spray bar 17) via the flexibility of the aerial boom 14 and maneuvering of the unmanned aerial vehicles 16, or via specialized nozzles on the aerial booms 14 that are closer to the center-rear of the vehicle 10 and that project liquid material a greater distance, or via unmanned aerial vehicles or a robotic arm equipped with nozzles and tethered to the vehicle via a fluid-carrying medium and operating independently of the aerial booms 14A, 14B.

FIGS. 1B-1C show example mechanisms for discharging material through fans of each of the unmanned aerial vehicles 16 (FIG. 1A) of an aerial boom. In FIG. 1B, an aerial boom 20 is shown, including a fluid-carrying medium 22 and a semi-flexible carrier 24. The carrier 24 may be similar to that depicted in, and described in association with, the carrier 18 of FIG. 1A. The fluid-carrying medium 22 may include an elastomeric or plastic hose. The continuity of the fluid-carrying medium 22 may be interrupted along its length by spaced-apart tee fittings 26 that GB19/34/US-2 are fluidly coupled to the fluid-carrying medium 22. Attached to the tee fittings 25 are nozzles 28. The nozzles 28 have a discharge end and an actuator (e.g., an electromagnetic device, such as a solenoid) that can selectively activate and deactivate the nozzle 28 and that may adjust (e.g., modulate or change the trajectory) fluid flow running through the nozzle 28. The actuator of each nozzle 28 may be energized and controlled via electrical/electronic cabling 30 (shown in phantom in FIG. 1B) or via wireless signals. In some embodiments, the electrical/electronic cabling may be bound to, or separate from yet in the same plane, as the fluid-carrying medium 22. The actuators may receive signaling from a controller located in the vehicle 10 (FIG. 1A) and/or from the unmanned aerial vehicle(s) 16 (FIG. 1A). In one embodiment, the tee fittings 26 (and hence the fluid-carrying medium 22) are supported by, and separated from, the carrier 24 via rigid members 32. The rigid members 32 may include a plastic bracket or housing to which the tee fittings 26 are secured (e.g., via cable ties, molded attachments, etc.). The fluid-carrying medium 22 runs parallel to the carrier 24, and may be located above the carrier 24 due to the separation maintained by the rigid members 32.

Co-planar with the carrier 24 are the unmanned aerial vehicles 16 (FIG. 1A), represented in FIG. 1B by electric-ducted fans 34. In the depicted embodiment, the fans 34 (e.g., 34A, 34B) may belong to the same unit (same unmanned aerial vehicle 16), and in some embodiments, the fans 34A, 34B may belong to different units (different unmanned aerial vehicles 16A, 16B). The carrier 24 is shown extending along the length of the aerial boom 20, though in some embodiments, segments between adjacent unmanned aerial vehicles may omit the carrier 24 (and hence adjacent unmanned aerial vehicles 16 are tethered via only the electrical/electronic cabling 30 and the fluid-carrying medium 22 in such embodiments). The nozzles 28 are shown located directly above the fans 34, with the nozzles 28 discharging liquid material directly onto the fans 34, resulting in the liquid material being atomized by the fans 34 to cover the plant canopy more fully than a continuous stream of liquid. By routing the nozzle discharge through the fans 34, less fluid may be used to cover a broader area of the vegetation as compared to a continuous stream, which helps to reduce the fluid weight on the aerial boom 20. The fans 34 are energized/powered and controlled via the electrical/ electronic cabling 30.

FIG. 10 shows an example arrangement where a semi-flexible carrier 36 (similar to the semi-flexible carrier 19 of FIG. 1A) runs adjacent to, and co-planar with, one side of fan housing or duct 38 (and hence fans 40) of the unmanned aerial vehicles 16. In this embodiment, the carrier 36 carries and supports electrical/electronic cabling 42 and the fluid-carrying medium 44. The fluid-carrying medium 44 is fluidly coupled to one or more fittings 46 (e.g., elbow fitting, tee fitting, plastic tubing, etc.) to which a nozzle 48 is coupled. An opening may be cut out or cast in the sides of the duct 38 and the carrier 36 to enable the fittings 46 and/or nozzle 48 to extend to a location adjacent to the fan 40. Liquid material may be discharged out of the nozzle 48 and into the fan 40, enabling atomization of the fluid passing through the fan 40. In some embodiments, denoted with dashed lines in FIG. 10, the fittings 46 may be configured to enable the nozzle 48 to discharge liquid material more towards or at the top of the fan 40, more closely approximating the nozzle-to-fan arrangement in FIG. 1B. In some embodiments, the liquid material (e.g., chemicals) may alternatively or additionally be injected in the air stream created by the electric ducted fans 38 (e.g., beneath the fans 38).

The aerial booms described above in association with FIG. 1A address the limitations of conventional, rigid mechanical booms by enabling the aerial boom to be dynamically, and in some embodiments, autonomously, adjusted anywhere from a few meters in length to several hundred meters in length, further enabling coverage of irregular fields and/or terrain that normally would present significant challenges in negotiating those terrains using conventional systems. Also, the reel arrangement and flow dispersion through one or more of the fans of the unmanned aerial vehicles improves upon existing unmanned aerial vehicle-based dispensing systems by providing for a compact and efficient system for nesting and launching tethered, unmanned aerial vehicles and/or reducing the weight of the fluid carried through the fluid-carrying medium through the efficiencies of the atomization process.

FIGS. 2A-3B illustrate various embodiments for using an aerial boom for crop extraction. Crop extraction may include crop extraction from vegetation (e.g., plants, trees) or crop extraction from or proximal to the ground. In general, the aerial boom used in these crop-extraction embodiments may be used to harvest crop and transfer to a mobile storage bin using a team of unmanned aerial vehicles, which reduces the cost and burden of manual crop extraction. Referring in particular to FIGS. 2A-2B, a vehicle 50 may include a storage bin or hopper 52 that receives harvested crop from aerial booms 54 (e.g., 54A, 54B) having a crop conveying medium 56 (e.g., 56A, 56B) and unmanned aerial vehicles 58 (e.g., 58A, 58B, 58C, and 58D). The aerial booms 54 may be coupled to the vehicle 50 in a manner that enables the aerial booms 54 to be swung out from the resting position adjacent and oriented parallel to the vehicle 50, tilted to enable extracted material placed on the aerial booms 54 to be transferred toward the storage bin 52 via gravity, and flexible (e.g., appropriately hinged) to enable the aerial booms 54 to rise and fall as needed. In one embodiment, the aerial booms 54 are coupled to the vehicle frame in a manner somewhat similar to conventional boom assemblies. In some embodiments, only tethering provides a physical attachment between the aerial booms 54 and the vehicle frame, where in an inactive state, the aerial booms 54 rest on the frame, and when launched, go airborne and orient relative to the vehicle 50 in a manner that facilitates the transfer of crop from the aerial booms 54 to the storage bin 52. The vehicle 50 may include components to operate the aerial booms via a tether, including one or more (electric or hydraulic) motors, vacuum pumps, and controls. The aerial booms 54A, 54B are shown extending laterally from the vehicle 50.

Each of the aerial booms 54 has one or more crop-extraction devices 60 (e.g., unmanned aerial vehicles 60A, 60B, 60C, and 60D) and/or 62 (e.g., robotic arm). The quantity and/or types of unmanned aerial vehicles 58 and crop-extraction devices 60 are shown for illustrative purposes, and that in some embodiments, different quantities of each may be used, including embodiments in which all crop-extraction devices are of the unmanned aerial vehicle type 60, of the robotic arm type 62, or a mixture in any quantities of both types. The crop-extraction devices 60 are shown tethered to the aerial booms 54, though in some embodiments, may be stand-alone devices that are activated when the aerial booms 54 are deployed and that fly back and forth between the vegetation from which crop is to be extracted and the aerial boom 54 and/or storage bin 52 for crop transfer. The unmanned aerial vehicles 58 and crop-extraction devices 60 are shown as having four (4) electric-ducted fans per unit, similar to that shown and described for the unmanned aerial vehicles of FIGS. 1A-1C, though in some embodiments, other quantities of the same or different type of fans/propellers for the unmanned aerial vehicles may be used.

The crop-extraction devices 60 are illustrated in various forms of operation, including an inactive or standby state (e.g., crop-extraction devices 60C, 60D), where the crop-extraction devices 60C, 60D are nested against the aerial boom 54B. For instance, though not shown, the nesting of the crop-extraction devices 60C, 60D may be achieved via return to one or more hooks located beneath the respective unmanned aerial vehicles 58C, 58D that releasably couple to corresponding hooks or anchor points atop the crop-extraction device 60C, 60D. In some embodiments, the aerial booms 54 may have a cradle or similar structure located underneath the aerial boom 54 that the crop-extraction devices 60 return to and position themselves within. In some embodiments, magnets or electromagnets residing beneath the aerial boom 54 (e.g., beneath the unmanned aerial vehicles 58) may be used to enable the nesting. These and/or other securement mechanisms may be used to enable the crop-extraction devices 60 to nest to the aerial booms 54.

In one embodiment, the crop-extraction devices 60 are coupled to the aerial boom 54 via a tether 64 (e.g., 64A, 64B). The tether 64 may include electrical/electronic cabling for power and control. The crop-extraction devices 60 may include navigational systems (e.g., GNSS devices) and one or more sensors, including proximity sensors, image sensors including charge-coupled devices (CCD), or complementary metal-oxide semiconductor (CMOS) devices that enable image capture and target identification, wherein a processor on the crop-extraction device 60 running image recognition software (or in some embodiments, a controller in the vehicle 50 running image software and conveying navigational instructions to the crop-extraction devices 60 over a wireless or wired communication medium) may recognize the crop and hone in on the crop location and cause the crop-extraction device 60 to navigate to the crop for closing the distance between the crop-extraction device 60 and the crop for extraction. In some embodiments, the tether 64 may further include a vacuum tube. For instance, one method that may be used by the crop-extraction device 60 to extract crop is by use of a vacuum tube 66 (e.g., 66A, 66B). That is, the crop-extraction device 60 may fly to the crop, as recognized by image-recognition software, and position the vacuum tube 66 to draw, through vacuum force, smaller crop, including beans, rice, coffee beans, etc., from the vegetation and into the vacuum tube 66. The vacuum tube 66 may be fluidly coupled to the tether 64, causing the extracted crop to be drawn to the crop conveying medium 56 (which in some embodiments, may also be a vacuum tube fluidly coupled to the tether 64) for eventual discharge to the storage bin 52. In some embodiments, the vacuum tube 66 may be used to extract the crop and secure, by vacuum force, the crop (or plural crop items) until the crop-extraction device 60 flies to the crop-conveying medium 56 and deposits the crop onto the crop-conveying medium 56 for transfer to the storage bin 52. In some embodiments, the crop-extraction device 60 may include a robotic arm (similar to crop-extraction device 62) in place of, or in addition to, the vacuum tube 66, for extraction of larger crop (e.g., apples). In some embodiments, the attachment used (e.g., vacuum tube 66, robotic arm) may be a readily substituted attachment.

In some embodiments, the crop-extraction device 62 configured as a robotic arm may be used in place of, or in addition to, the crop-extraction device 60. The crop-extraction device 62 may be coupled to the aerial boom 54 via a swivel mechanism, and may have multiple hinge points to enable degrees of freedom that facilitate crop extraction and deposit onto the crop conveying medium 56. In one embodiment, the crop-extraction device 62 is coupled to the aerial boom (e.g., in place of the crop-extraction devices 60), and the maneuverability of the aerial boom 54 is relied upon to close the distance between the reach of the crop-extraction devices 62 and the crop. In some embodiments, the crop-extraction devices 62 may have a telescoping architecture that facilitates closing the gap between the crop and the crop-extraction device 62. In some embodiments, the crop-extraction devices 62 may be interspersed among the crop-extraction devices 60 along the aerial boom 54.

The crop-conveying medium 56 may be configured as a moving conveyor, a lightweight pan, a vacuum tube, or any combination thereof. For instance, the crop-conveying medium 56 may be constructed using the semi-flexible carrier described above in association with FIGS. 1A-1C, wherein a vacuum tube (and electrical/electronic cabling) are placed within for receiving crop material from the vacuum tubes of the tethers 64. The aerial booms 54 are coupled to the vehicle 50 using at least a tether that may include the vacuum tube and electrical/electronic cabling. The vacuum tube running within the flexible carrier may have a tee fitting or valve such that crop material can be routed to be discharged from the crop conveying medium 56 to the storage bin 52 without interfering with the vacuum. In some embodiments, the crop-conveying medium 56 may be a lightweight open pan (e.g., made of plastic or aluminum). In such embodiments, a coupling mechanism 68 (shown on one side only) that mechanically couples the aerial boom 54 to the vehicle 50 may include an actuator that tilts the aerial boom 54 such that crop deposited onto the crop conveying medium 56 moves along the crop-conveying medium 56 according to gravity until it falls into the storage bin 52, as best shown in FIG. 2B. In some embodiments, the tilt may be achieved by the unmanned aerial vehicles 58 adjusting their elevation relative to the ground. For instance, the unmanned aerial vehicle 58A may rise relative to the other unmanned aerial vehicles of the aerial boom 54A, the unmanned aerial vehicle 58B may fly to a lower elevation relative to the other unmanned aerial vehicles 58 of the aerial boom 54A, or adjustments in elevation may be implemented by both unmanned aerial vehicles 58A, 58B. In certain embodiments, the unmanned aerial vehicles 58A, 58B may cooperate to cause a wave action of the crop-conveying medium 56 to move crop toward the storage bin 52.

In some embodiments, a combination of adjustments at the coupling mechanism 68 and the flight elevation adjustments of the unmanned aerial vehicles 58 may be implemented to enable the tilt. In some embodiments, the crop-conveying medium 56 may include a moving conveyor. For instance, the electrical/electronic cabling of the tether running between the vehicle 50 and the aerial booms 54 may not only power the unmanned aerial vehicles 58 and the crop-extraction devices 60, 62 and any sensors, but the electrical/electronic cabling may also power a small motor residing on the aerial booms 54 that cause the rotation of an elastomeric, endless conveyor belt about rollers running and/or driven underneath the belt. The conveyor thus receives crop extracted and deposited by the crop-extraction devices 60, 62 and causes their transfer to the edge of the aerial boom 54 from which the crop drops into the storage bin 52. In some embodiments, one or more of these mechanisms may be combined to influence crop transfer from the crop conveying medium 56 to the storage bin 52.

Figure 3A:
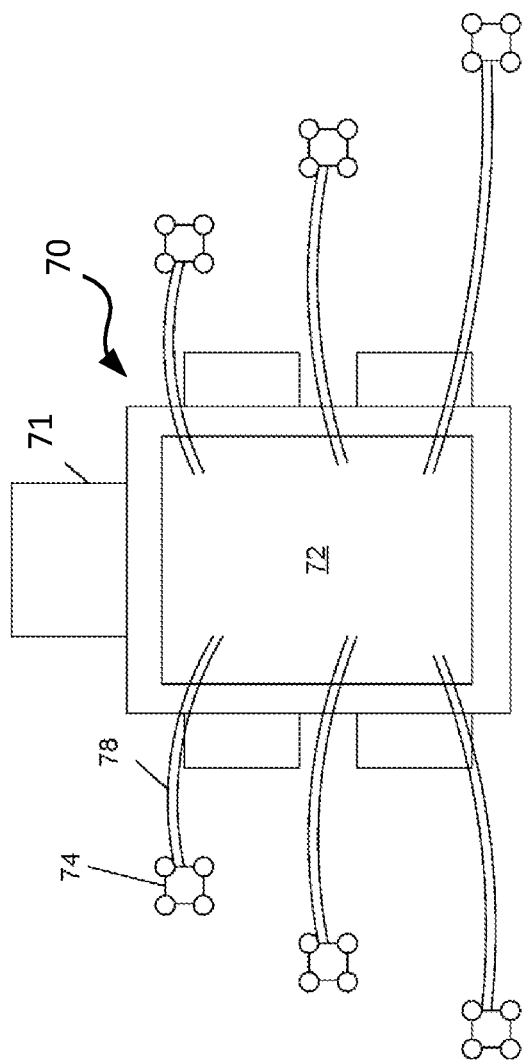
FIGS. 3A-3B are schematic diagrams that illustrate in fragmentary, overhead plan and rear elevation views, respectively, an embodiment of example individual aerial booms.
Figure 3B:
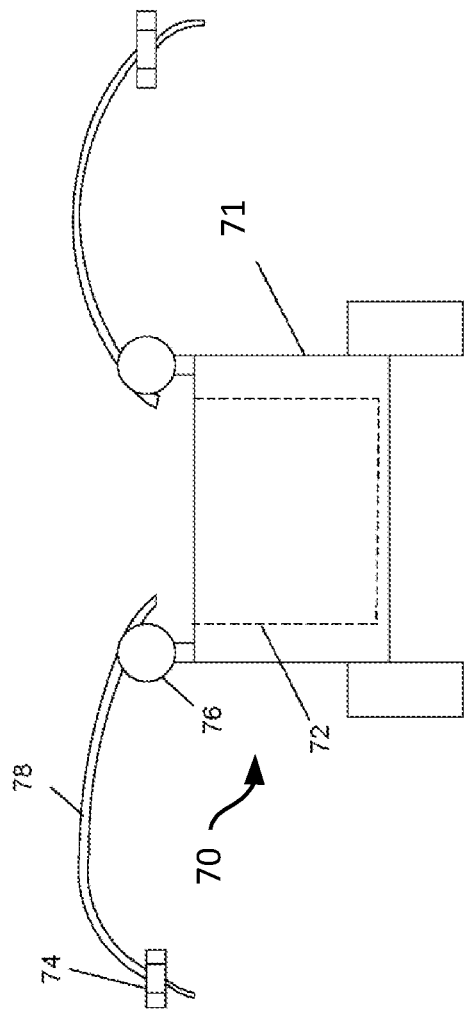

FIGS. 3A-3B illustrate yet another crop-extraction embodiment. A vehicle 70 having a chassis 71 is shown in fragmentary overhead plan (FIG. 3A) and rear end view (FIG. 3B), and includes a storage bin 72 that is filled by unmanned aerial vehicles 74 that are each tethered to a respective reel 76 mounted on the vehicle 70. Upon activation, each unmanned aerial vehicle 74 launches from its perch on the reel in similar fashion to that described above in association with FIG. 1A. For instance, each reel 76 may be driven by one or more motors that, at least in the initial stage of activation, begins to rotate to enable the tether 78 and unmanned aerial vehicle 74 to unwind from the reel 76. In effect, the tether 78 serves as an aerial boom in this embodiment. Sensors on or proximal to the reel 76 and/or on the unmanned aerial vehicle 74 detect the loosened tethering (e.g., tension sense) and prompt the unmanned aerial vehicle 74 to launch from its perch on the reel 76, resulting in the unmanned aerial vehicle 74 flying from the reel 76 to a location where crop is to be extracted. The unmanned aerial vehicle 74 may have a navigational system and image sensors (e.g., CCD or CMOS sensors) to detect the crop and extract the crop from the vegetation. Each unmanned aerial vehicle 74 may act independently of, yet in coordination (e.g., as a team) with, other unmanned aerial vehicles 74 via known drone-swarm technology/software, and each reel 76 may be activated independently or all at once, depending on the stage of operations.

In some embodiments, the unmanned aerial vehicle 74 may be perched on the reel 76 in a manner that, upon activation, the unmanned aerial vehicle 74 launches from the reel 76, pulling the tether 78 along with it, with or without cooperation of a motor-driven reel (e.g., the motor may be used only to take up slack or increase tension upon the return of the unmanned aerial vehicle 74 to a location closer to the vehicle 70 or in the initial stages of launch to loosen the tether 78 and unmanned aerial vehicle 74 from its perch). In some embodiments, the reel 76 may be driven by a motor in cooperation with control signals provided by the unmanned aerial vehicle 74. As an example of the latter embodiment, the activation of the unmanned aerial vehicle 74 (e.g., either via operator control and/or automatically upon entering a given geofence) may trigger a processor on the unmanned aerial vehicle 74 to send a control signal to a vehicle controller that controls a motor controlling the reel 76, which in turn triggers the reel to start turning to loosen the tether 78 and unmanned aerial vehicle 74 from the reel 76. Upon detecting that the unmanned aerial vehicle 74 is loosened from its perch, the unmanned aerial vehicle 74 begins to fly away from the reel 76 while pulling the tether 78 along with it. A projected flight path of the unmanned aerial vehicle 74 70 may be communicated to the motor (via a vehicle controller), enabling the reel 76 to adjust the tension of the tether 78 via rotation of the reel 76. Stated generally, there may be an interplay between tension and/or proximity sensing, communications between the unmanned aerial vehicle 74 and a vehicle controller, and motor activation causing the reel 76 to be driven under the tension on the tether 78 via the flight of the unmanned aerial vehicle 74.

Each unmanned aerial vehicle 74 may include a crop-conveying medium, for instance, a vacuum tube, residing in the tether 78 (situated along with electrical/electronic cabling in a wrapped bundle or as part of a semi-flexible carrier as described above). The vacuum tube may run from beneath the unmanned aerial vehicle 74 (best shown in FIG. 3B) to a point beyond the reel 76. For instance, vacuum pressure (e.g., driven by a vacuum pump on the vehicle 70) may enable the unmanned aerial vehicle 74 to extract the crop (detected using camera sensors and processed using image recognition software), and transfer the crop via the vacuum pressure to the storage bin 72. In some embodiments, the unmanned aerial vehicle 74 may be equipped with a robotic arm instead of the vacuum tube, and similar to that described above, the robotic arm extracts the crop and the unmanned aerial vehicle 74 flies to the storage bin 72 and drops the crop off into the storage bin 72.

Figure 4A:
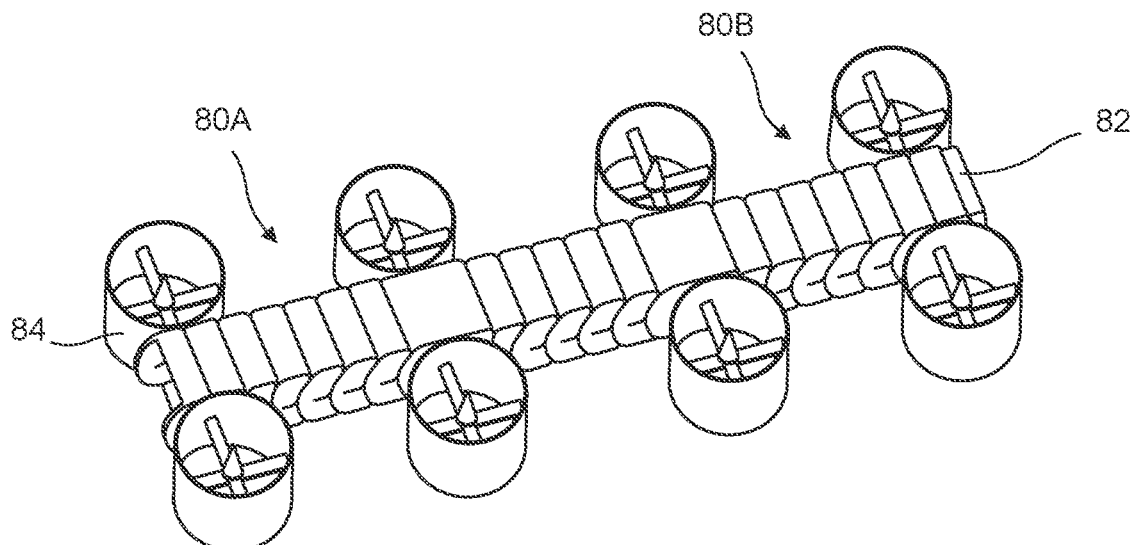
FIGS. 4A-4C are schematic diagrams that illustrate an embodiment of a tethering mechanism for coupling the unmanned aerial vehicles, or their fans, together.
Figure 4B:
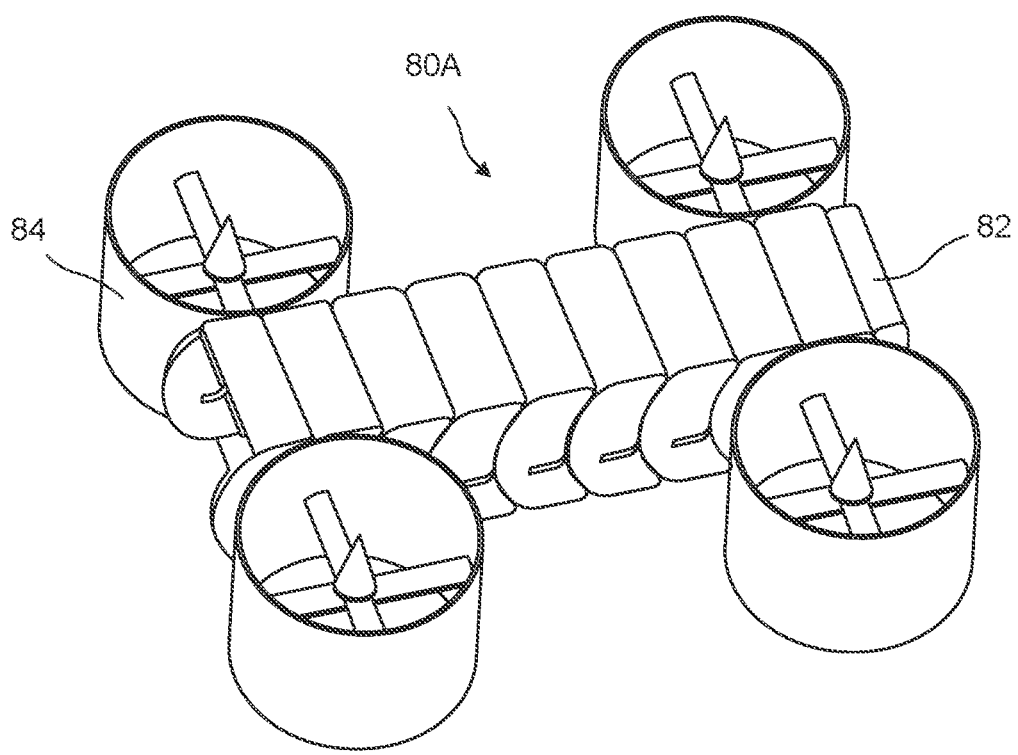
Figure 4C:
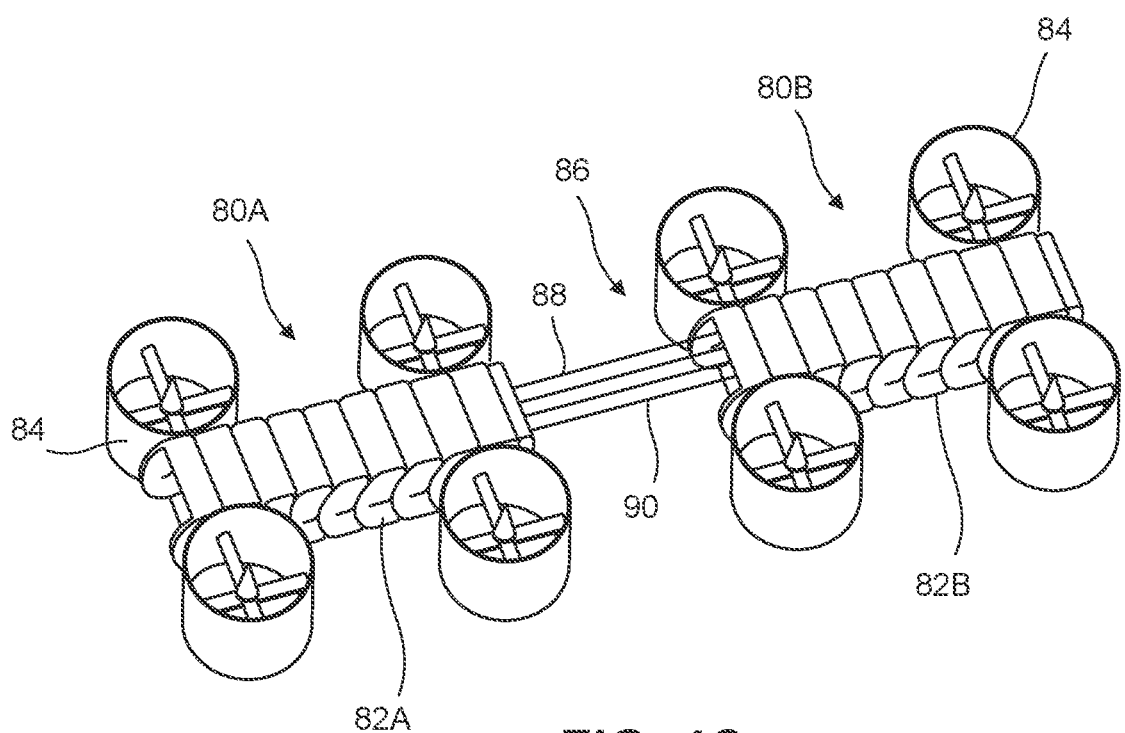

FIGS. 4A-4C illustrate a tethering mechanism for stringing or coupling the unmanned aerial vehicles, or their fans, together to create an aerial boom. For instance, two unmanned aerial vehicles 80 (e.g., 80A, 80B) are shown coupled to a semi-flexible carrier 82. The semi-flexible carrier 82 is similar in structure and function as described above (e.g., carrier 18, FIG. 1A. carrier 24, FIG. 1B, etc.), and the unmanned aerial vehicles 80 are similar in structure and function to those described above (e.g., unmanned aerial vehicles 16, FIG. 1A, unmanned aerial vehicles 58, FIG. 2A, crop-extraction device 60, FIG. 2A, etc.). The unmanned aerial vehicles 80 depicted in FIGS. 4A-4C include electric-ducted fans 84, each secured to the outside walls of the carrier 82 using known fastening mechanisms (e.g., one or more of screws, bolts, adhesives, etc.). As shown in FIGS. 4A-4B, the carrier 82 not only couples the electric-ducted fans 84 of a single unmanned aerial vehicle 80A (as best shown in FIG. 4B), but also, in one embodiment, couples plural unmanned aerial vehicles 80 together (e.g., unmanned aerial vehicles 80A, 80B, as best shown in FIG. 4A). As described above, the carrier 82 serves as a tether that may contain therein electrical/electronic cabling, a fluid-carrying medium, and/or a crop-conveying medium. In one embodiment, the entirety of the carrier 82 and the unmanned aerial vehicles 80 form an aerial boom. In some embodiments, though shown with a top surface, the carrier 82 may contain an open top (e.g., exposing a crop-conveying medium, including a conveyor, pan, etc.).

In some embodiments, and as depicted in FIG. 4C, the unmanned aerial vehicles 80A and 80B may be separated by a gap or segment that omits the carrier 82. In other words, a tether 86 between the unmanned aerial vehicles 80A, 80B may consist entirely of a fluid-carrying medium 88 (e.g., a hose for enabling the flow of liquid material) and/or electrical/electronic cabling 90 (e.g., for providing power and control for the unmanned aerial vehicles 80, sensors, nozzles, etc.). That is, there is no carrier 82 between unmanned aerial vehicles 80 in the embodiment of FIG. 4C. Each of the electric ducted fans 84 of the unmanned aerial vehicle 80A are coupled to each other using the carrier 82A. Similarly, each of the ducted fans of unmanned aerial vehicle 80B are coupled to each other using the carrier 82B. Omission of the carrier 82 between adjacent unmanned aerial vehicles 80 may enable further flexibility in the overall tether that includes the carrier 82 and the tether 86, and in general, more flexibility and reduced weight to the resulting aerial boom that includes the unmanned aerial vehicles 80.

Figure 4D:
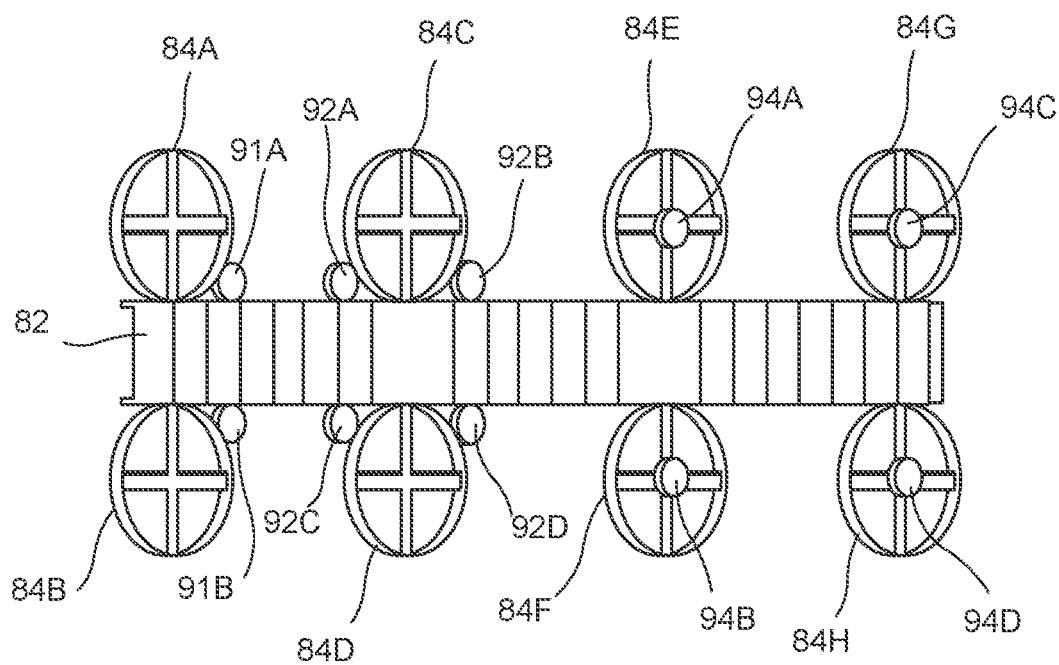
FIG. 4D is a schematic diagram that illustrates various example nozzle arrangements for certain embodiments of an aerial boom.

FIG. 4D illustrates in fragmentary, overhead view various example nozzle arrangements for an embodiment of an aerial boom including a carrier 82 and electric-ducted fans 84 of the unmanned aerial vehicles (e.g., unmanned aerial vehicles 80 of FIGS. 4A-4C). Nozzles 91A and 91B are shown coupled to the carrier 82 and adjacent to one side of a pair of fans 84A, 84B. Nozzles 92A-92D are coupled to the carrier 82 and adjacent each side of fan 84C and 84D. Electric-ducted fans 84E-84H each have nozzles 94A-94D located directly above the fans 84E-84H. In one embodiment, the nozzles 94A-94D may be suspended over the fans 84E-84H (e.g., as in FIG. 1B), or centrally coupled to the ducted fans 84E-84H as depicted in FIG. 4D. The nozzle arrangement may include a combination of any one of these, including with fewer or additional nozzles coupled to the carrier 82. In some embodiments, nozzles may be located in other areas of the aerial boom, including half-way in between unmanned aerial vehicles 80 or, in the case of the embodiment depicted in FIG. 4C, in areas where there is no carrier 82.

FIGS. 5A-5D illustrate reels for winding and unwinding the unmanned aerial vehicles. In FIGS. 5A-5B, two reels 96, 98 are shown side-by-side. The reels 96, 98 may be the reels 12 depicted in part in FIG. 1A, or each reel 96, 98 may be larger versions of the reels 76 depicted in FIG. 3B. The reels 96, 98 may be mounted to the chassis or anywhere on the frame of a self-propelled or towed vehicle. The reels 96, 98 have a respective shaft 100, 102. Each shaft 100, 102 may be driven by one or more motors, or may be driven by a single common motor. Each shaft 100, 102 may have a separate clutching mechanism that enables independent reel action, and in some instances, switching between free rotation and controlled rotation. Aerial booms 104, 112 may be wound and unwound from the shafts 100, 102 as described above. In one embodiment, the aerial booms 104, 112 includes one or more (one shown) unmanned aerial vehicles 106, 114 having electric-ducted fans 108, 116 coupled to a tether 110, 118 (e.g., a semi-flexible carrier as one example and depicted in FIGS. 5A-5B). Electrical/electronic cabling, a fluid-carrying medium, and/or a crop conveying medium may be contained within the tether 110, 118.

The unmanned aerial vehicles 106, 114 are depicted as either returning (winding) or launching (unwinding) from the respective reels 96, 98 in opposite directions. For instance, and referring to FIG. 5A in particular, in the case of launching, the unmanned aerial vehicle 106 is launching from the reel 96 and heading toward the right hand side to work on the right hand side of a vehicle, and the unmanned aerial vehicle 114 is launching from the reel 98 towards the left hand side to work on the left hand side of a vehicle. The reels 96, 98 may rotate concurrently in some instances and/or rotate at different times and/or rates of rotation. The manner of rotation to enable unwinding or winding may be different than that depicted in these figures in some embodiments. For instance, in the case of FIG. 5A, and assuming an unwinding (launching) from the reel 98, rotation is counter-clockwise and the unwinding is achieved from over the shaft 102. However, in some embodiments, the rotation for unwinding may be clockwise where the unwinding is achieved from under the shaft 102.

FIGS. 5C-5D illustrate further examples of the unwinding or winding of an aerial boom from or to a reel. For instance, in FIG. 5C, one reel 120 is depicted with an aerial boom 122 comprising multiple unmanned aerial vehicles 124 (e.g., 124A, 124B) coupled to a tether 126 configured as a semi-flexible carrier, the aerial boom 122 unwinding (or winding) onto a central shaft 128 through one or a combination of motor-driven reel rotation or via the tension involved by the unmanned aerial vehicle flight. FIG. 5D conceptually shows a reel 130 with an aerial boom 132, comprising multiple unmanned aerial vehicles 134 coupled together via a tether 136. The aerial boom 132 is wrapped around a central shaft 138 of the reel 130.

Figure 6B:
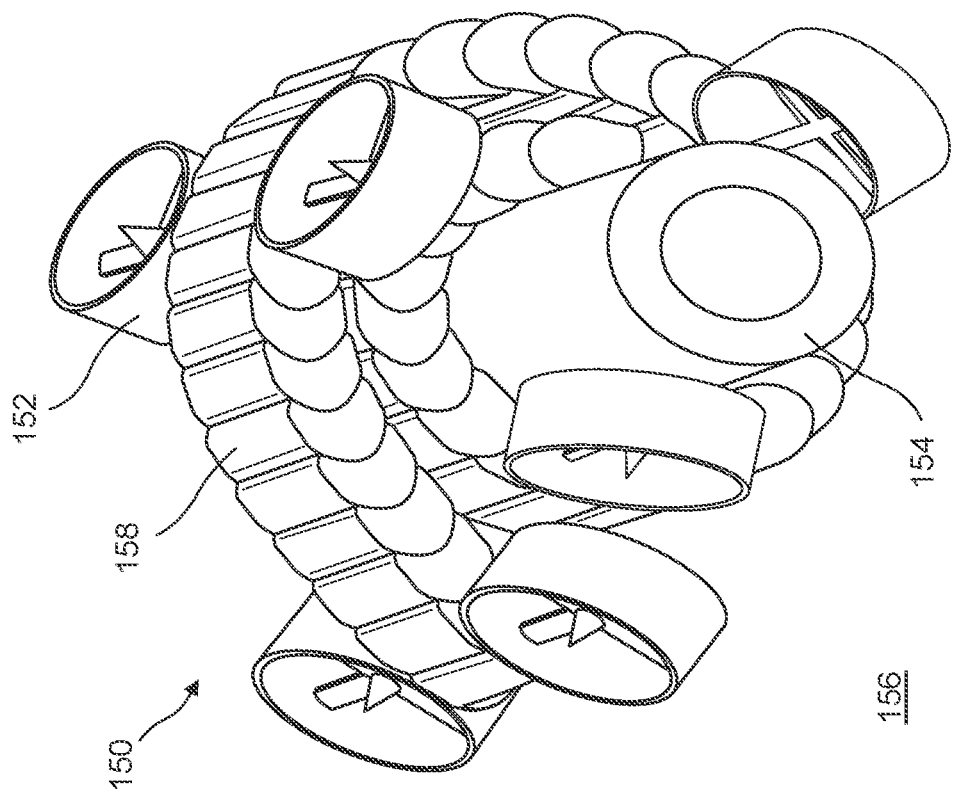
FIGS. 6A-6B are schematic diagrams that illustrate, in fragmentary, isometric views, winding and unwinding of a single and multiple unmanned aerial vehicles for an embodiment of an example aerial boom.
Figure 6A:
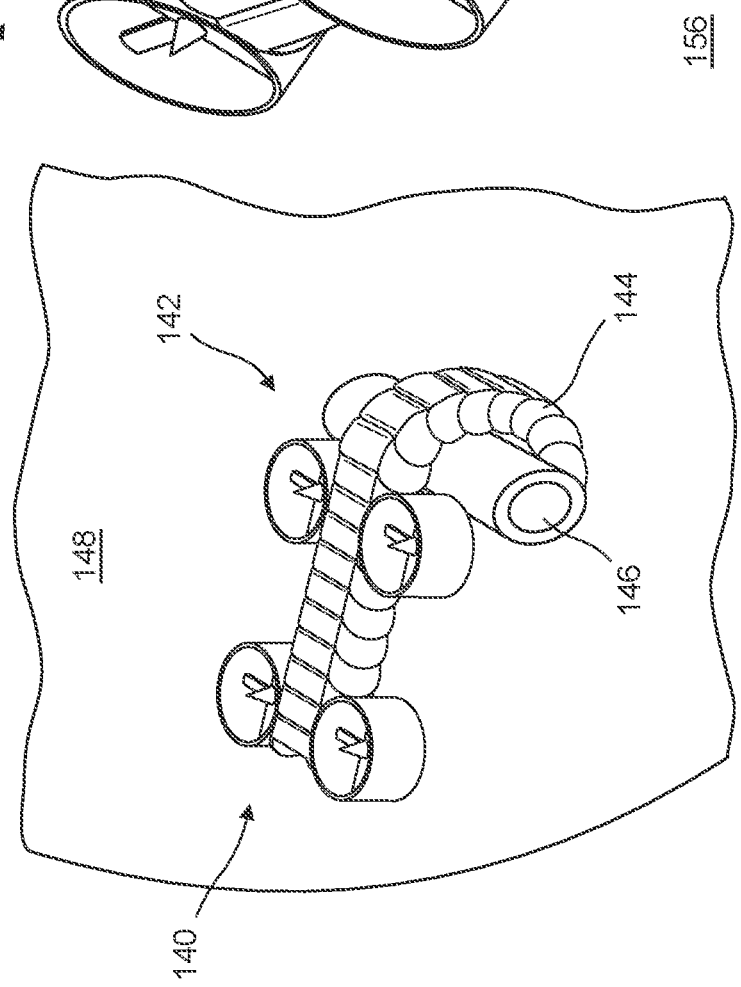

FIGS. 6A-6B are schematic diagrams that further illustrate the winding or unwinding of a single and multiple unmanned aerial vehicles, respectively, for an embodiment of an example aerial boom. In FIG. 6A, an aerial boom 140 includes a single unmanned aerial vehicle 142 coupled to a tender 144 (e.g., semi-flexible carrier), which is shown wrapped around a shaft 146 of a reel 148. In FIG. 6B, an aerial boom 150 includes multiple unmanned aerial vehicles 152 tendered together, and is shown wrapped around a shaft 154 of a reel 156. In effect, the unmanned aerial vehicles 152 are perched on the reel 156 (e.g., on the shaft 154) in a stacked manner, the tether 158 overlaps on itself, and the electric-ducted fans of the unmanned aerial vehicles 152 are disposed on each side of the overlapping tether 158.

Figure 7A:
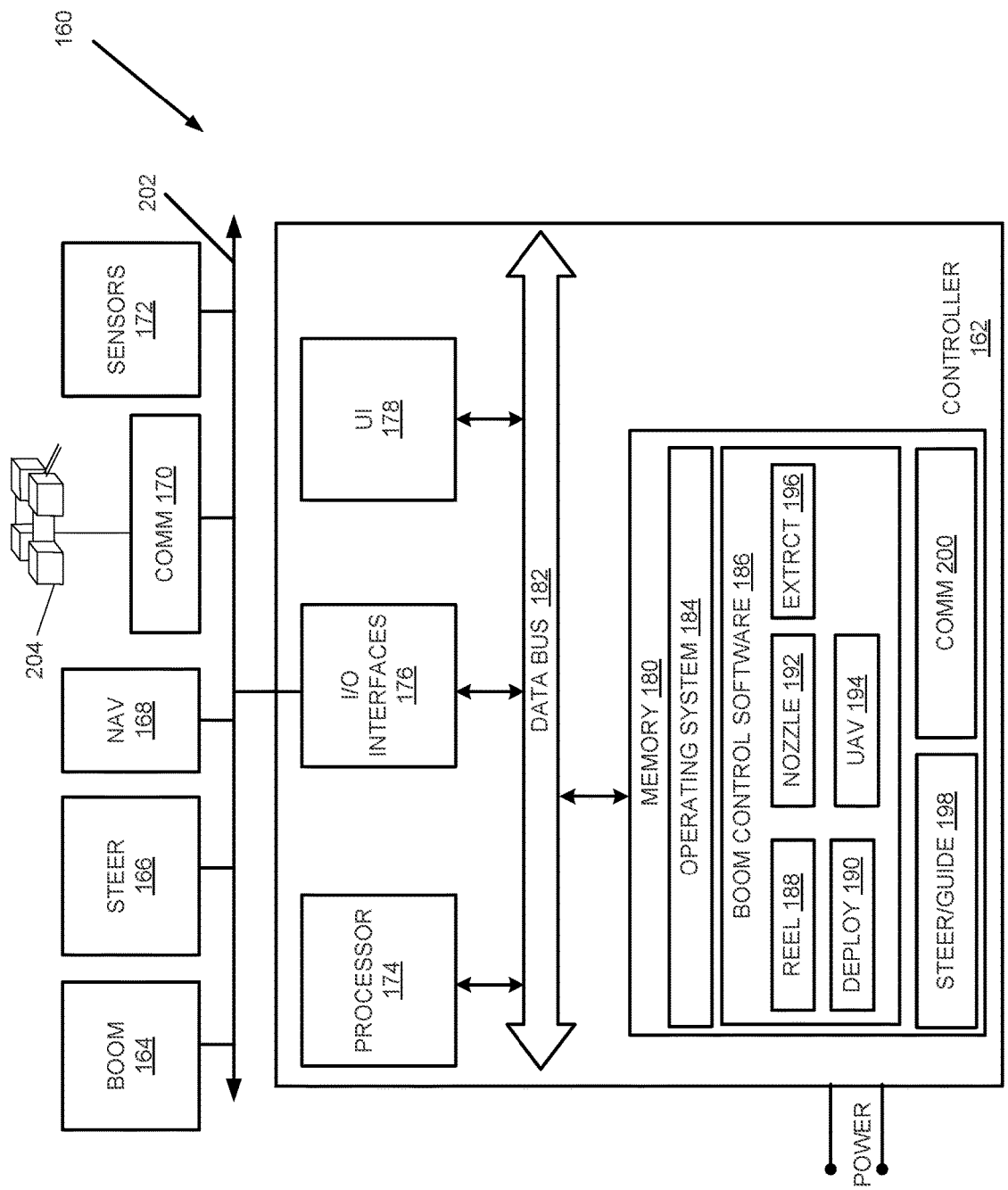
FIG. 7A is a schematic diagram that illustrates an embodiment of an example control system for activating an aerial boom and associated components.

FIG. 7A illustrates an example control system 160 that may be used in conjunction with an aerial boom. The control system 160 depicted in FIG. 7A is one illustration for achieving control of deployment and operations of the aerial boom, and in some embodiments, a different number of components, or a different control arrangement, may be used to implement the functionality described above for the various embodiments of an aerial boom. In the depicted embodiment, the control system 160 includes one or more vehicle controllers 162 (one shown), and various controls including aerial boom controls (BOOM) 164, steering controls (STEER) 166, navigational system controls (NAV) 168, including a Global Navigation Satellite system (GNSS) (e.g., Global Positioning System (GPS), inertial components, among others), communication system (COM) 170 (e.g., cellular modem, wireless modem), and sensors 172 (e.g., environmental sensors, etc.). In some embodiments, navigation may be facilitated through the use of cellular mechanisms (e.g., triangulation). Though illustrated using a single controller 162, in some embodiments, a sprayer nozzle spacing system may be controlled by controllers operating under distributed or centralized control (e.g., peer-to-peer, master-slave, etc.). In some embodiments, control may be further distributed among the controller 162 and/or control system 160 and processing/control functionality of the unmanned aerial vehicles, as explained further below. In the context of the present disclosure, the example controller 162 is merely illustrative, and some embodiments of the controller 162 and/or control system 160 may have fewer or additional components, and/or some of the functionality associated with the various components depicted in FIG. 7A may be combined, or further distributed among additional modules and/or devices. Functionality of modules described herein may be implemented as software (including firmware, microcode), hardware, or a combination of software and hardware. In some embodiments, functionality of the controller 162 may be implemented according to any of various types of devices, including a computer, programmable logic controller (PLC), FPGA device, ASIC device, microprocessor, among other devices. Well-known components of computer devices are omitted here to avoid obfuscating relevant features of the controller 162.

In one embodiment, the controller 162 includes one or more processors, such as processor 174, input/output (I/O) interface(s) 176, a user interface (UI) 178, and memory 180, all coupled to one or more data busses, such as data bus 182.

The memory 180 may include any one or a combination of volatile memory elements (e.g., random access memory (RAM, such as DRAM, SRAM, SDRAM, etc.)) and non-volatile memory elements (e.g., ROM, Flash, solid state, EPROM, EEPROM, etc.). The memory 180 may store a native operating system, one or more native applications, emulation systems, or emulated applications for any of a variety of operating systems and/or emulated hardware platforms, emulated operating systems, etc. In the embodiment depicted in FIG. 7A, the memory 180 includes an operating system 184 and boom control software 186, which includes reel control software (REEL) 188, boom deployment software (DEPLOY) 190, nozzle control software (NOZZLE) 192, unmanned aerial vehicle software (UAV) 194, and crop-extraction control software (EXTRCT) 196. The memory 180 may also include one or more additional software modules, including auto-guidance/auto-steer control software (GUIDE) 198 and communications software 200, among other software. Reference to software may include executable code (instructions) in the form of software, firmware, middleware, and/or microcode or op code. In some embodiments, the software/firmware modules depicted in FIG. 7A may be arranged in other ways (e.g., as sub-components or modules of another module). In some embodiments, functionality of one or more of the software modules depicted in FIG. 7A may reside in memory of one or more unmanned aerial vehicles, such as one or more unmanned aerial vehicles 204. Additional or fewer software modules (e.g., combined functionality) may be employed in the memory 180 or additional memory. For instance, in some embodiments, memory 180 may not include auto-guidance/auto-steer software 198 and/or communications software 200. In some embodiments, a separate storage device may be coupled to the data bus 182, such as a persistent memory (e.g., optical, magnetic, and/or semiconductor memory and associated drives).

The processor 174 may be a custom-made or commercially available processor, a central processing unit (CPU), an auxiliary processor among several processors, a semiconductor-based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 162.

The I/O interfaces 176 provide one or more interfaces to a network, which in one embodiment includes a communication medium 202. In one embodiment, the communication medium 202 includes a wired medium (e.g., controller area network (CAN) bus), a wireless medium (e.g., Bluetooth channel(s), near field communications (NFC), 802.11 radio frequency (RF), etc.), or a combination of wired and wireless media. The I/O interfaces 176 may include any number of interfaces for the input and output of signals (e.g., analog or digital data) for conveyance over the communication medium 184. In the depicted embodiment, the aerial boom controls 164, steering controls 166, navigational system controls 168, communication system 170, and sensors 172 are coupled to the medium 202, enabling communication of signals/data with the controller 162 via the I/O interfaces 176. Further, control signals may also be communicated between the unmanned aerial vehicles 204 and the controller 162 via the communication system 170.

The user interface (UI) 178 may include a keyboard, mouse, microphone, touch-type display device, head-set, and/or other devices (e.g., switches) that enable input by an operator and/or provide outputs (e.g., visual and/or audible) feedback to the operator.

The manner of connections among two or more components depicted in FIG. 7A may be varied. For instance, in some embodiments, the user interface 178 may be directly connected to the medium 202, and in communication with the controller 162 via the I/O interfaces 176.

The aerial boom controls 164 cooperate with the boom control software 186 to enable certain functionality of the aerial booms. For instance, the aerial boom controls 164 may include one or more motors (e.g., hydraulic, electric), directional valves equipped with solenoids, switches, and/or actuators (e.g., solenoids) that are used in cooperation with the reel control software 188 to activate and deactivate and control the reels. An operator may select controls in the passenger cab of the vehicle (e.g., on a touch-screen display, electromechanical switches, etc.) to activate the reels in some embodiments, which in turn triggers one or more motors to begin rotation of the reels. In some embodiments, the reel control software 188 may receive geofence information from the navigational system controls (e.g., GNSS system) and, based on a targeted field location programmed in memory 180 (e.g., stored field map), travel upon a targeted field may trigger activation of the reels with or without operator input, causing the reels to rotate and the unmanned aerial vehicles to activate and begin flight for operations. The reel control software 188 may also receive input from sensors 172, including proximity sensors, LIDAR, tension sensors, etc., which assists the reel control software 188 in unwinding or winding aerial booms about the reels, alone, or in coordination with the forces created by the flight by the unmanned aerial vehicles. In some embodiments, the reel control software 188 may receive input additionally or alternatively from the unmanned aerial vehicles in determining when to increase or decrease tension on the aerial booms when operating in relation to the reels.

The boom deployment software 190 likewise works in cooperation with the aerial boom controls 164. In one embodiment, the aerial boom controls 164 further include one or more actuators to deploy each of the aerial booms when mechanically coupled to a vehicle, and also cause the appropriate tilt of the aerial booms. For instance, and referring to FIGS. 2A and 2B, the boom deployment software 190 may receive operator input (or in some embodiments, receive location information and field map information) and cause the aerial booms 54 to swing out (via actuation of the one or more hydraulic or electric/electromagnetic actuators) from their transport position and tilt if needed (e.g., gravity feed applications). In some embodiments, the aerial booms 54 may merely be coupled to the vehicle via a swiveling mechanism, and upon receiving the operator input (or upon recognizing a field location), the boom deployment software 190 cooperates with the unmanned aerial vehicle software 194 to cause the unmanned aerial vehicles 58 (FIGS. 2A-2B) to begin flight. For instance, upon activation, the unmanned aerial vehicles 58 go airborne and orient the aerial booms 54 from the transport position (e.g., resting on a frame of the vehicle 50) to an operating position (e.g., extended out from the vehicle 50) to enable extraction and transfer of extracted crop to the storage bin 52. In some embodiments, a boom-deployment coupling mechanism may not be present, but rather, the aerial booms 54 may, in their inactive state, be nested onto a saddle or cradle on the frame of the vehicle 50 and coupled to the vehicle 50 only by a tether (that includes the electrical/electronic cabling and a crop conveying medium). In this latter embodiment, the boom deployment software 190 (in cooperation with the unmanned aerial vehicle software 194) causes the unmanned aerial vehicles 58 to activate (e.g., via operator input or automatically upon detection in a geofence) and go airborne, whereby the unmanned aerial vehicles 58 orient the aerial boom 54 into its operational position (e.g., extending outward from the vehicle 50).

Figure 1B:
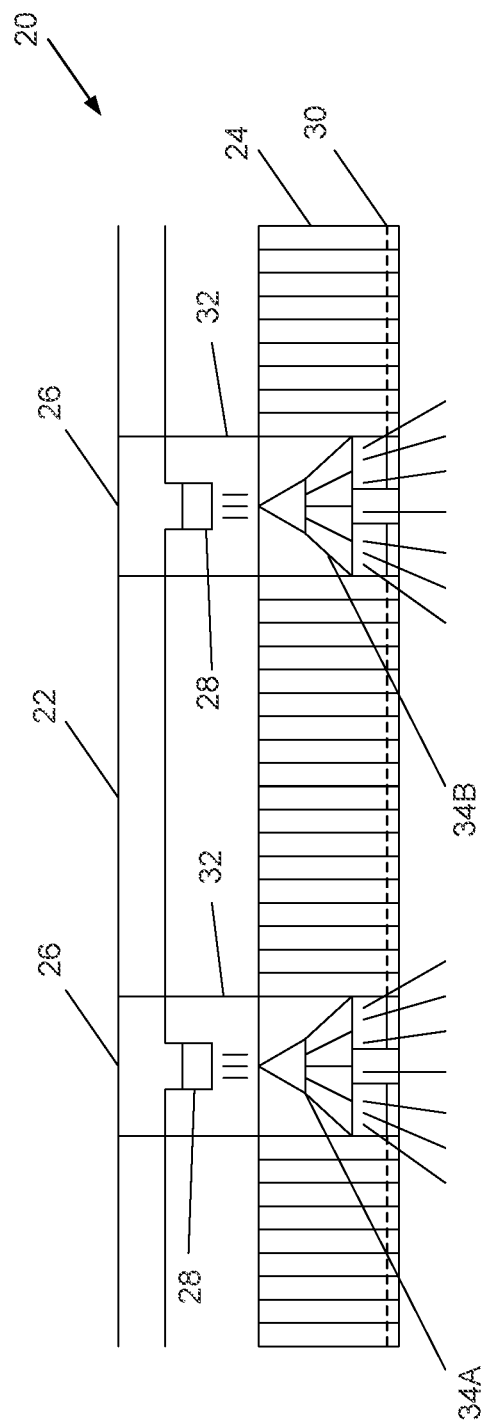
FIGS. 1B-1C are schematic diagrams that illustrate in fragmentary, partial cut-away side and front elevation views, various example mechanisms for discharging the material through fans of unmanned aerial vehicles of an aerial boom.
Figure 1C:
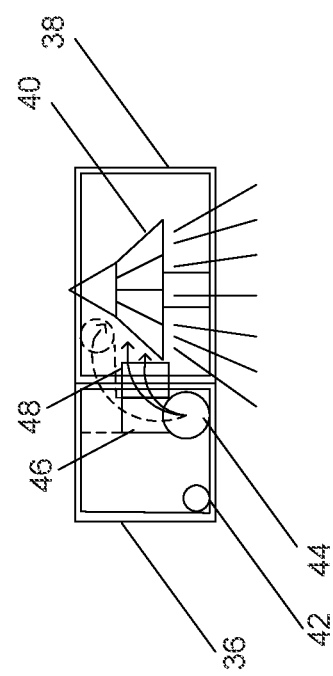

The nozzle control software 192 may be used to cause signaling to the aerial boom controls 164 (e.g., actuators associated with the nozzles) to activate and deactivate selected nozzles. As noted above, the nozzles may dispense liquid material through the electric-ducted fans of the unmanned aerial vehicles (e.g., as depicted in FIG. 1B and FIG. 10) and/or without discharging through the fans (e.g., as depicted in part in FIG. 4D). In some embodiments, the nozzle control software 192 may operate in conjunction with navigational system controls 168 and the unmanned aerial vehicle software 194 (or like functionality residing on the unmanned aerial vehicles 16 (FIG. 1A)), where field maps residing in memory 180 (or uploaded into memory of the unmanned aerial vehicles 16) help guide or control the dispensing of liquid material from the nozzles as signaled by the controller 162 (via communication system 170) or controlled by the unmanned aerial vehicle containing nozzle control software functionality. In some embodiments, sensors on the unmanned aerial vehicles 16 (or located elsewhere along the carrier 18) may be used to feed information about the vegetation back to the nozzle control software 192, which in turn may be used to selectively activate the nozzles. In some embodiments, the unmanned aerial vehicles 16 may be equipped with nozzle control software functionality to selectively activate the nozzles based on the sensor input (e.g., so as to not waste liquid material on a pond of water or a path lacking vegetation).

The unmanned aerial vehicle software 194 may be used to activate or deactivate the unmanned aerial vehicles and/or control their flight. For instance, the unmanned aerial vehicle software 194 may receive input from the boom deployment software 190 or the reel control software 188 to activate the unmanned aerial vehicles. In some embodiments, sensors 172 and/or sensors located on the unmanned aerial vehicles may be used to activate/deactivate or control the flight of the unmanned aerial vehicle (e.g., via signals exchanged at the communication system 170 in cooperation with the communications software 200). For instance, sensors located on the unmanned aerial vehicles may detect obstacles (e.g., trees, power lines, etc.) and either act autonomously to avoid these obstacles or signal to the unmanned aerial vehicle software 194 the presence of these obstacles, which in turn causes the unmanned aerial vehicle software 194 to signal a change in flight pattern for the affected unmanned aerial vehicle or aerial boom. As noted above, the navigational system controls 168 may also be used in conjunction with the unmanned aerial vehicle software 194 to control the flight of the unmanned aerial vehicles according to a field map. In some embodiments, flight control and/or activation and deactivation functionality resides all or in part within the controls on the unmanned aerial vehicles.

The crop-extraction control software 196 may cooperate with various aerial boom controls to enable crop extraction. For instance, the crop-extraction control software 196 may activate vacuum pumps, motors (e.g., used to drive conveyors), and/or deployment and/or control of the crop-extraction devices. Sensory input communicated to the crop-extraction control software 196 from the unmanned aerial vehicles may be interpreted by the crop-extraction control software 196 using image-recognition software, and instructions communicated back to the unmanned aerial vehicle to activate the crop-extraction tools (e.g., vacuum tube 66, FIG. 2A or actuators or motors used in the robotic arm). In some embodiments, functionality of the crop-extraction control software 196 may reside all or in part in the unmanned aerial vehicle.

Figure 7B:
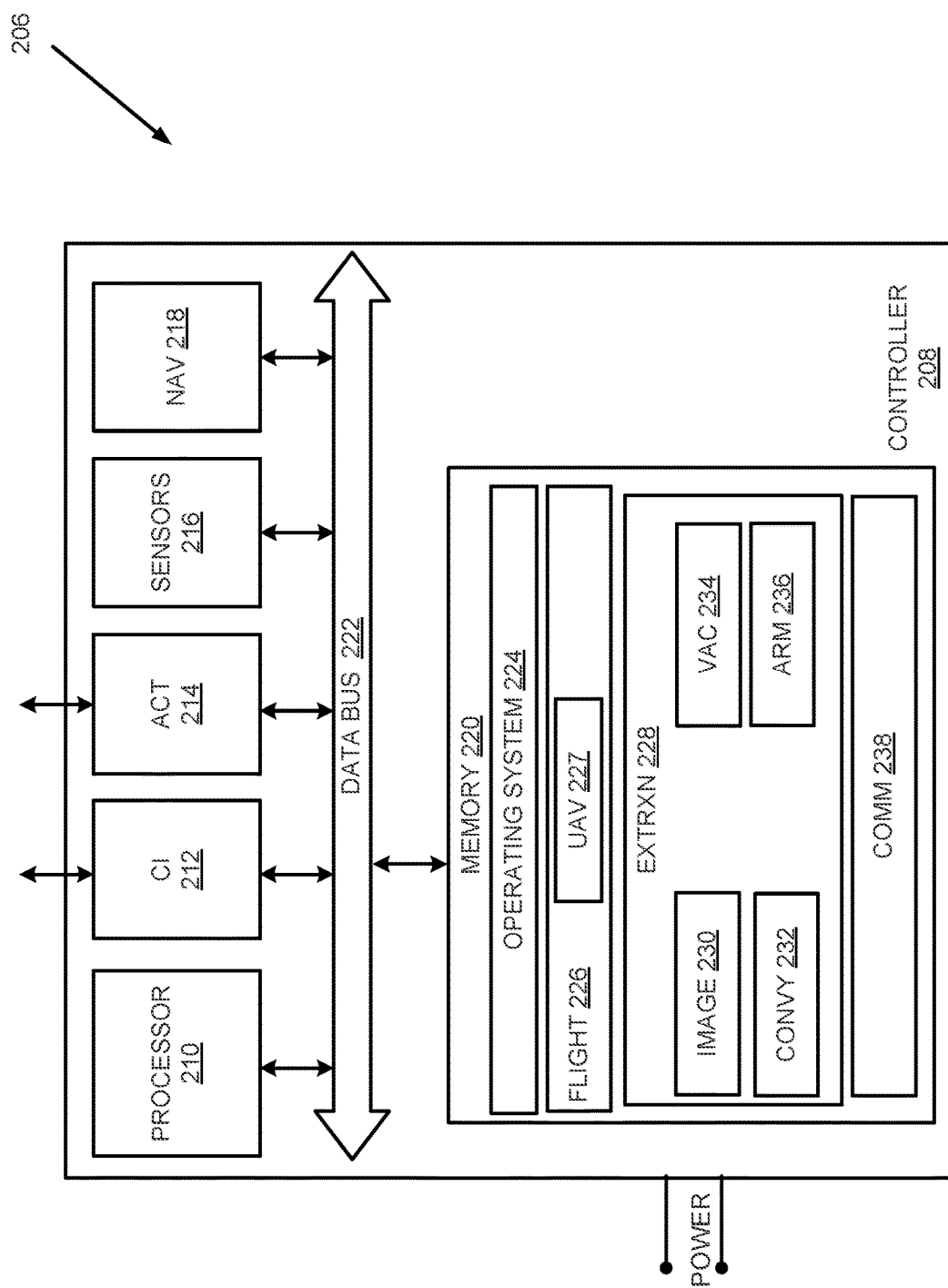
FIG. 7B is a schematic diagram that illustrates an embodiment of an example controller for an unmanned aerial vehicle.

Functionality described above may be combined (e.g., modules combined), and in some embodiments, the functionality of all or part of the boom control software 186 may reside and be executed at the unmanned aerial vehicle, or executed in distributed or peer-to-peer fashion between the controller 162 and the processing functionality of the unmanned aerial vehicles, as illustrated in FIG. 7B and described further below.

The steering controls 166 include hydraulic, pneumatic, electrical, and/or electromagnetic components to implement vehicle steering and/or navigation. The navigational system controls 168 include functionality to determine a location and direction or heading of the vehicle, and include any one or more of a variety of GNSS systems (e.g., GPS, GLONASS, etc.).

In one embodiment, the steering controls 166, navigational system controls 168, and the auto-steer/guidance control software 198 cooperate to enable autonomous or semi-autonomous control of the vehicle based on the coordinates determined from the GNSS system (or in some embodiments, using the cellular modem or wireless fidelity components of the communication system 170 in cooperation with the communication software 200).

The communication system 170 operates in conjunction with the communication software 200 to enable cellular and/or wireless (e.g., wireless fidelity, 802.11, Bluetooth, NFC, etc.) communications. Control of the vehicle may be partially or entirely via remote control (e.g., from a farm manager office, contractor, etc.). In some embodiments, field maps may be accessed from a remote server. The communication system 170 in conjunction with the communication software 200 enables bidirectional communication between the unmanned aerial vehicles and the controller 162. In some embodiments, this communication may be achieved wirelessly, or via cabling (electronic cabling). The communication system 170 may include a cellular and/or wireless modem in some embodiments and one or more antennas. In some embodiments, the communication system 170 includes transmit-and-receive functionality to enable wired communications between the unmanned aerial vehicles and the controller 162.

The sensors 172 include one or more of wheel angle sensors, ground speed sensors, machine inclination sensors, environmental sensors (e.g., wind sensors, humidity sensors, etc.), crop height sensors, tether tension sensors, proximity sensors, LIDAR, radar, image sensors, among others. In some embodiments, one or more of these types of sensors 172 may reside on the aerial booms.

When certain embodiments of the controller 162 are implemented at least in part with software (including firmware), as depicted in FIG. 7A, the software can be stored on a variety of non-transitory computer-readable storage medium for use by, or in connection with, a variety of computer-related systems or methods. In the context of this document, a computer-readable storage medium may include an electronic, magnetic, optical, or other physical device or apparatus that may contain or store a computer program (e.g., executable code or instructions) for use by or in connection with a computer-related system or method. The software may be embedded in a variety of computer-readable storage mediums for use by, or in connection with, an instruction execution system, apparatus, or device, such as a computer-based system, processor-containing system, or other system that can fetch the instructions from the instruction execution system, apparatus, or device and execute the instructions.

The controller 162 may be powered by a battery or other source of electricity (e.g., solar, generator, etc.).

FIG. 7B shows an example processing architecture 206 having functionality that may be used all or in part for the unmanned aerial vehicles and/or the crop-extraction devices. The processing architecture 206 is depicted as having a computer architecture embodied as a controller 208, though functionality of the controller 208 may be implemented as a microprocessor, ASIC, FPGA, or circuitry including discrete components (e.g., digital or analog circuitry), among other types of components or devices. In one embodiment, the controller 208 includes one or more processors 210, a communications interface (CI) 212, one or more actuators (ACT) 214, one or more sensors 216, navigational system controls 218, and memory 220, all coupled to a data bus 222. Memory 220 includes an operating system 224, executable code (instructions) that includes flight control software (FLIGHT) 226, and crop-extraction control software (EXTRXN) 228. The flight control software 226 includes unmanned aerial vehicle navigation/guidance software (UAV) 227. The crop-extraction control software 228 includes image software (IMAGE) 230, conveyor control software (CONVY) 232, vacuum-extraction control software (VAC) 234, and arm-control software 236. The memory 220 further includes communications software (COMM) 238. Reference to software may include executable code (instructions) in the form of software, firmware, middleware, and/or microcode or op code. In some embodiments, the (software) modules depicted in FIG. 7B may be arranged in other ways (e.g., as sub-components or modules of another module). In some embodiments, functionality of one or more of the software modules depicted in FIG. 7B may reside in memory 180 of the vehicle controller 162. Additional or fewer software modules (e.g., combined functionality) may be employed in the memory 220 or additional memory. For instance, for the crop-extraction device 62 (robotic arm) of FIG. 2A, it may not be necessary to have flight control software 226. In some embodiments, a separate storage device may be coupled to the data bus 222, such as a persistent memory (e.g., optical, magnetic, and/or semiconductor memory and associated drives).

The memory 220 may include any one or a combination of volatile memory elements (e.g., random access memory (RAM, such as DRAM, SRAM, SDRAM, etc.)) and non-volatile memory elements (e.g., ROM, Flash, solid state, EPROM, EEPROM, etc.). The memory 220 may store a native operating system, one or more native applications, emulation systems, or emulated applications for any of a variety of operating systems and/or emulated hardware platforms, emulated operating systems, etc.

The processor 210 may be a custom-made or commercially available processor, a central processing unit (CPU), an auxiliary processor among several processors, a semiconductor-based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 208.

The communication interface 212 provides one or more interfaces (e.g., transmitter/receiver or transceiver) for sending or receiving signals or instructions to or from the controller 162 (FIG. 7A) or from other unmanned aerial vehicles. In one embodiment, the communication interface 212 may receive and send signals over a wired medium (e.g., electrical/electronic cabling), a wireless medium (e.g., Bluetooth channel(s), near field communications (NFC), 802.11 radio frequency (RF), etc.), or a combination of wired and wireless media. The communication interface 212 may include any number of interfaces for the input and output of signals (e.g., analog or digital data) for conveyance over the communication medium. Thus, the communication interface 212 enables the exchange of communications between the unmanned aerial vehicles and the vehicle controller 162 and/or other devices (e.g., sensors, crop-extraction devices, etc.) of the aerial booms and/or the vehicle.

The actuators 214 may include motors, electromagnetic switches, rotary actuators, hydraulic actuators, pneumatic actuators, electric/electromagnetic actuators (e.g., solenoids), among other devices. For instance, actuators may be used to open and close and/or maneuver a robotic arm, or control the vacuum pressure. As another example, actuators may be used to drive a moving conveyor. In some embodiments, actuators 214 may include nozzle actuators (e.g., where the unmanned aerial vehicle controls activation of the nozzles through the electric-ducted fans or elsewhere along the aerial booms).

The sensors 216 include one or more of aerial speed sensors, proximity sensors (e.g., to detect crop height, obstacles, etc.), tether tension sensors, LIDAR, radar, image sensors (e.g., CCD, CMOS, etc.), among others. For instance, image sensors may be used to detect the presence or absence of crop or vegetation and the type of crop or vegetation, or obstacles that pose a risk of collision between the unmanned aerial vehicle or aerial boom and an object in the field. In some embodiments, one or more of these types of sensors 216 may reside on the aerial booms.

The navigational system controls 218 may include a navigational system similar to that described above for the control system 160 (FIG. 7A), including inertial controls (e.g., gyroscope), GNSS devices, etc.

Referring to the software of the controller 208, the flight control software 226 includes the unmanned aerial vehicle navigation/guidance software 227, which in one embodiment, cooperates with the navigational system controls 218 to autonomously fly to and from crop and/or follow rows (e.g., furrows in the soil, crop rows, etc.) for enabling accurate extraction of crop and/or dispensing of liquid material. The flight control software 226 may be uploaded with a flight plan and/or field map (e.g., manually or automatically via communications from the vehicle controller 162). The flight control software 226 may fly according to the plan/map and/or based on sensor signal input. In one embodiment, the unmanned aerial vehicle navigation/guidance software 227 includes known drone-swarm software that facilitates the operations of the crop-extraction devices in working along with other crop-extraction devices in extracting crop material. As noted above, in some embodiments, the unmanned aerial vehicles and/or crop-extraction devices may be controlled all or in part by the vehicle controller 162.

The crop-extraction control software 228 facilitates extraction of crop, as described in association with FIGS. 2A-2B. In one embodiment, the crop-extraction control software 228 includes image software 230. The image software 230 operates in coordination with the sensors 216 (e.g., imaging sensors) to recognize crop and, in cooperation with the vacuum-extraction control software 234 and/or arm-control software 236, enable extraction of the crop (e.g., by aligning the vacuum tube or robotic arm to the crop). In some embodiments, the crop-extraction control software 228 further includes the conveyor control software 232. For instance, the conveyor control software 232 may trigger one or more actuators 214 (e.g., a drive motor) to drive a shaft, gear, or wheels that cause a conveyor to move. The crop-extraction device (e.g., crop-extraction device 60), when it launches from its nested position along the aerial boom, may trigger activation by the conveyor control software 232 of the actuators 214, causing the conveyor to begin operation. In some instances, the conveyor may be triggered upon extraction of the first crop. The crop-extraction control software 228 further includes vacuum-extraction control software 234 and/or the arm control software 236, which cooperates with the actuators 214 to trigger activation and enable extraction of crop. The software functionality described above as residing in the memory 220 of the unmanned aerial vehicles and/or crop-extraction devices may reside in fewer than all of these devices and/or with fewer modules (e.g., combined functionality, or omitted functionality). For instance, one of the unmanned aerial vehicles among an aerial boom may serve a master function with the other unmanned aerial vehicles of the aerial boom are subordinate (and under the control) of the master, particularly when the unmanned aerial vehicles are supporting the aerial boom. In some embodiments, particularly when using drone-swarm software with the crop-extraction devices, the crop-extraction devices may operate according to a peer-to-peer control scheme. In some embodiments, one or more of the software functionality may be implemented at the vehicle controller 162, or implemented in peer-to-peer fashion with the vehicle controller 162.

When certain embodiments of the controller 208 are implemented at least in part with software (including firmware), as depicted in FIG. 7B, the software can be stored on a variety of non-transitory computer-readable storage medium for use by, or in connection with, a variety of computer-related systems or methods. In the context of this disclosure, a computer-readable storage medium may include an electronic, magnetic, optical, or other physical device or apparatus that may contain or store a computer program (e.g., executable code or instructions) for use by or in connection with a computer-related system or method. The software may be embedded in a variety of computer-readable storage media for use by, or in connection with, an instruction execution system, apparatus, or device, such as a computer-based system, processor-containing system, or other system that can fetch the instructions from the instruction execution system, apparatus, or device and execute the instructions.

The controller 208 may be powered by a battery or other source of electricity (e.g., solar, generator, etc.).

A method for implementing spraying through one or more fans of unmanned aerial vehicles, depicted in FIG. 8 and denoted as method 240, includes receiving liquid material at one or more nozzles from a fluid-carrying medium fluidly coupled to the one or more nozzles (242), and discharging the liquid material through one or more fans of an unmanned aerial vehicle (244). The liquid material is atomized by the fans and spread as a canopy over targeted vegetation or soil.

Figure 9:
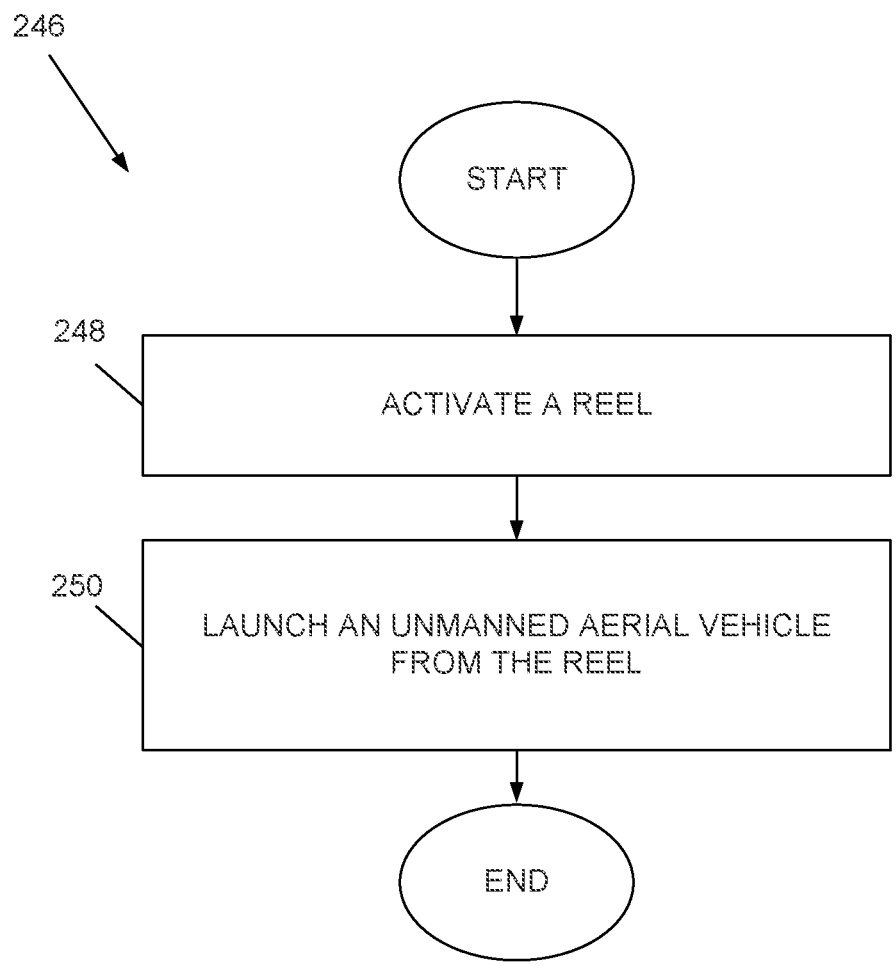
FIG. 9 is a flow diagram that illustrates an embodiment of an example method for launching one or more unmanned aerial vehicles from one or more reels.

A method for launching one or more unmanned aerial vehicles from one or more reels, depicted in FIG. 9 and denoted as method 246, includes activating a reel (248), and launching an unmanned aerial vehicle from the reel (250).

A method for extracting crop from an aerial boom, depicted in FIG. 10 and denoted as method 252, includes suspending a crop conveying medium in air using plural unmanned aerial vehicles tethered together (254), and using one or more crop-extraction devices to extract crop and transfer the crop to the crop conveying medium (256).

Any process descriptions or blocks in flow diagrams should be understood as representing logic and/or steps in a process, and alternate implementations are included within the scope of the embodiments in which functions may be executed out of order from that shown or discussed, including substantially concurrently, or with additional steps (or fewer steps), depending on the functionality involved, as would be understood by those reasonably skilled in the art of the present disclosure.

While the present invention has been described herein with respect to certain illustrated embodiments, those of ordinary skill in the art will recognize and appreciate that it is not so limited. Rather, many additions, deletions, and modifications to the illustrated embodiments may be made without departing from the scope of the invention as hereinafter claimed, including legal equivalents thereof. In addition, features from one embodiment may be combined with features of another embodiment while still being encompassed within the scope of the invention as contemplated by the inventors. Further, embodiments of the disclosure have utility with different and various machine types and configurations.

What is claimed is:

1. A system, comprising:
   a vehicle comprising a chassis;
   a storage bin mounted to the chassis;
   a reel mounted to the chassis;
   a tether comprising a vacuum tube configured to be wound about the reel; and
   at least one unmanned aerial vehicle attached to the tether, wherein when the at least one unmanned aerial vehicle is at rest, the at least one unmanned aerial vehicle resides on the reel;
   wherein the storage bin is configured to store material received from the at least one unmanned aerial vehicle via the vacuum tube.

2. The system of claim 1, wherein the at least one unmanned aerial vehicle comprises at least two unmanned aerial vehicles attached to the tether.

3. The system of claim 1, wherein the tether comprises a power cable.

4. The system of claim 3, wherein the tether comprises a semi-flexible carrier that carries the power cable.

5. The system claim 4, wherein the semi-flexible carrier extends an entire length of the tether.

6. The system of claim 4, wherein the semi-flexible carrier comprises a plurality of segments separated by segments of the tether that do not include the semi-flexible carrier.

7. The system of claim 1, wherein the at least one unmanned aerial vehicle is configured to fly away from the reel as the tether unwinds.

8. The system of claim 1, further comprising a motor configured to rotate the reel.

9. The system of claim 1, further comprising;
   an additional reel mounted to the chassis;
   an additional tether configured to be wound about the additional reel and at least one additional unmanned aerial vehicle attached to the additional tether,
   wherein when the at least one additional unmanned aerial vehicle is at rest, the at least one additional unmanned aerial vehicle resides on the additional reel.

10. The system of claim 9, wherein the at least one unmanned aerial vehicle flies from the reel in a direction when unwinding from the reel that is opposite a direction the at least one additional unmanned aerial vehicle flies when unwinding from the additional reel.

11. The system of claim 9, wherein the at least one unmanned aerial vehicle flies from the reel in a direction when unwinding from the reel that is the same as a direction the at least one additional unmanned aerial vehicle flies when unwinding from the additional reel.

12. The system of claim 1, further comprising at least one nozzle fluidly coupled to the tether and configured to discharge material.

13. The system of claim 1, wherein a tank is configured to deliver fluid to the at least one unmanned aerial vehicle via the tether.

14. A method of extracting crop from an agricultural field, the method comprising:
    propelling a vehicle through the field, the vehicle comprising:
      a chassis;
      a storage bin mounted to the chassis;
      a reel mounted to the chassis;
      a tether comprising a vacuum tube wound about the reel; and
      at least one unmanned aerial vehicle attached to the tether wherein the at least one unmanned aerial vehicle resides on the reel;
    rotating the reel to unwind the tether;
    launching the at least one unmanned aerial vehicle as the tether unwinds from reel; and
    transferring material from the at least one unmanned aerial vehicle to the storage bin via the vacuum tube.

15. The method of claim 14, wherein the at least one unmanned aerial vehicle comprises a plurality of unmanned aerial vehicles attached to the tether, and wherein launching the at least one unmanned aerial vehicle comprises sequentially launching the plurality of unmanned aerial vehicles as the tether unwinds from the reel.

16. The method of claim 14, wherein rotating the reel comprises rotating the reel with a motor.

17. The method of claim 14, wherein launching the at least one unmanned aerial vehicle comprises applying a rotational force to the reel via the tether being pulled by the at least one unmanned aerial vehicle.

18. The method of claim 14, further comprising extracting crop from the field with the at least one unmanned aerial vehicle.

* * * * *